United States Patent
Bonnefous et al.

(10) Patent No.: US 12,514,541 B2
(45) Date of Patent: Jan. 6, 2026

(54) ULTRASOUND IMAGING FOR VISUALIZATION AND QUANTIFICATION OF MITRAL REGURGITATION

(71) Applicant: KONINKLIJKE PHILIPS N.V., Eindhoven (NL)

(72) Inventors: Odile Bonnefous, Rueil-Malmaison (FR); Jean-Michel Rouet, Paris (FR); Alexandre This, Versailles (FR); Hernan Morales, Suresnes (FR); Jimmy Li-Shin Su, Arlington, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 16 days.

(21) Appl. No.: 18/683,877

(22) PCT Filed: Aug. 10, 2022

(86) PCT No.: PCT/EP2022/072497
§ 371 (c)(1),
(2) Date: Feb. 15, 2024

(87) PCT Pub. No.: WO2023/020920
PCT Pub. Date: Feb. 23, 2023

(65) Prior Publication Data
US 2024/0366182 A1 Nov. 7, 2024

(30) Foreign Application Priority Data
Aug. 17, 2021 (EP) .................................. 21191602

(51) Int. Cl.
*A61B 8/08* (2006.01)
*A61B 8/00* (2006.01)
*A61B 8/06* (2006.01)

(52) U.S. Cl.
CPC .............. *A61B 8/0883* (2013.01); *A61B 8/06* (2013.01); *A61B 8/466* (2013.01); *A61B 8/483* (2013.01);
(Continued)

(58) Field of Classification Search
CPC ......... A61B 8/0883; A61B 8/06; A61B 8/466; A61B 8/483; A61B 8/488; A61B 8/5207; A61B 8/5223; A61B 8/5246
See application file for complete search history.

(56) References Cited

U.S. PATENT DOCUMENTS 4,913,159 A * 4/1990 Gardin ................ G01S 7/52071
600/456
9,996,935 B2 * 6/2018 Srinivasan ................ G06T 7/11
(Continued)

FOREIGN PATENT DOCUMENTS

| EP | 2654569 A1 | 10/2013 |
|---|---|---|
| EP | 3692925 A1 | 8/2020 |
| WO | 2020164955 A1 | 2/2020 |

OTHER PUBLICATIONS

Robinson S, Ring L, Augustine DX, Rekhraj S, Oxborough D, Harkness A, Lancellotti P, Rana B. The assessment of mitral valve disease: a guideline from the British Society of Echocardiography. Echo Res Pract. Sep. 27, 2021;8(1):G87-G136. doi: 10.1530/ERP-20-0034. PMID: 34061768; PMCID: PMC8495880.*
(Continued)

*Primary Examiner* — Bo Joseph Peng

(57) ABSTRACT

An ultrasound system includes a processor circuit in communication with an array of acoustic elements and a display. The processor circuit receives B-mode and/or Doppler ultrasound data representative of mitral regurgitation associated with an orifice in a mitral valve. The processor circuit generates a model of the orifice and outputs a graphical representation of the model of the orifice to the display. The
(Continued)

processor circuit generates a blood flow model of the mitral regurgitation based on the model of the orifice. The processor circuit compares the blood flow model to the Doppler data. The processor circuit changes the model of the orifice (e.g., a different shape, a different position, and/or a different orientation) such that the blood flow model is changed to match the Doppler data. The processor circuit outputs a graphical representation of the orifice with the different shape, the different position, and/or the different orientation to the display.

11 Claims, 27 Drawing Sheets

(52) U.S. Cl.
CPC ............ *A61B 8/488* (2013.01); *A61B 8/5207* (2013.01); *A61B 8/5223* (2013.01); *A61B 8/5246* (2013.01)

(56) References Cited

U.S. PATENT DOCUMENTS

| | | | |
|---|---|---|---|
| 2013/0261457 A1* | 10/2013 | Wei | A61B 8/13 600/441 |
| 2013/0261458 A1* | 10/2013 | Wei | A61B 8/4488 600/441 |
| 2014/0052001 A1* | 2/2014 | Ionasec | A61B 5/7264 600/440 |
| 2015/0366532 A1* | 12/2015 | Voigt | A61B 8/488 600/408 |
| 2019/0125295 A1 | 5/2019 | Tek et al. | |
| 2024/0202919 A1* | 6/2024 | Shige | G06T 7/0012 |

OTHER PUBLICATIONS

Thomas H. Marwick et al. Quantitative Assessment of Mitral Regurgitation: How Best to Do It, JACC: Cardiovascular Imaging, vol. 5, Issue 11, 2012, pp. 1161-1175,ISSN 1936-878X, https://doi.org/10.1016/j.jcmg.2012.07.013.*

Militaru, S. et al., "Validation of Semiautomated Quantification of Mitral Valve Regurgitation by Three-Dimensional Color Doppler Transesophageal Echocardiography," Journal of the American Society of Echocardiography, 2020, vol. 33, Issue 3, pp. 342-354.

International Search Report and Written Opinion for PCT/EP2022/072497; Mailing date: Dec. 5, 2022, 9 pages.

* cited by examiner

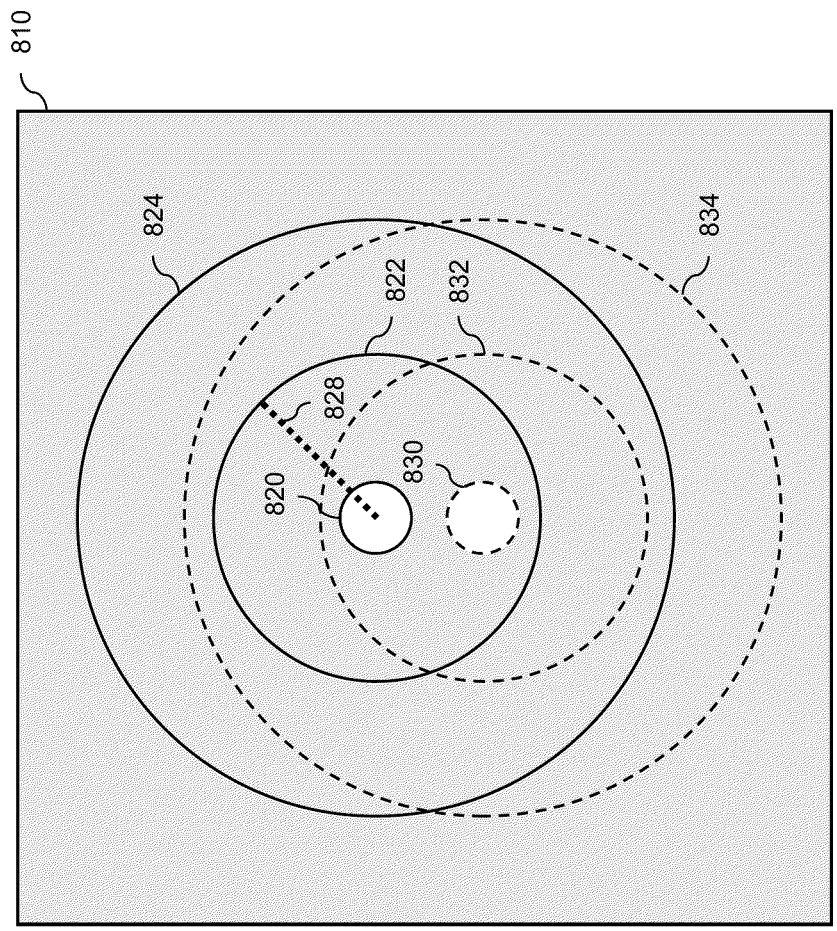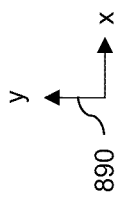
Fig. 8A

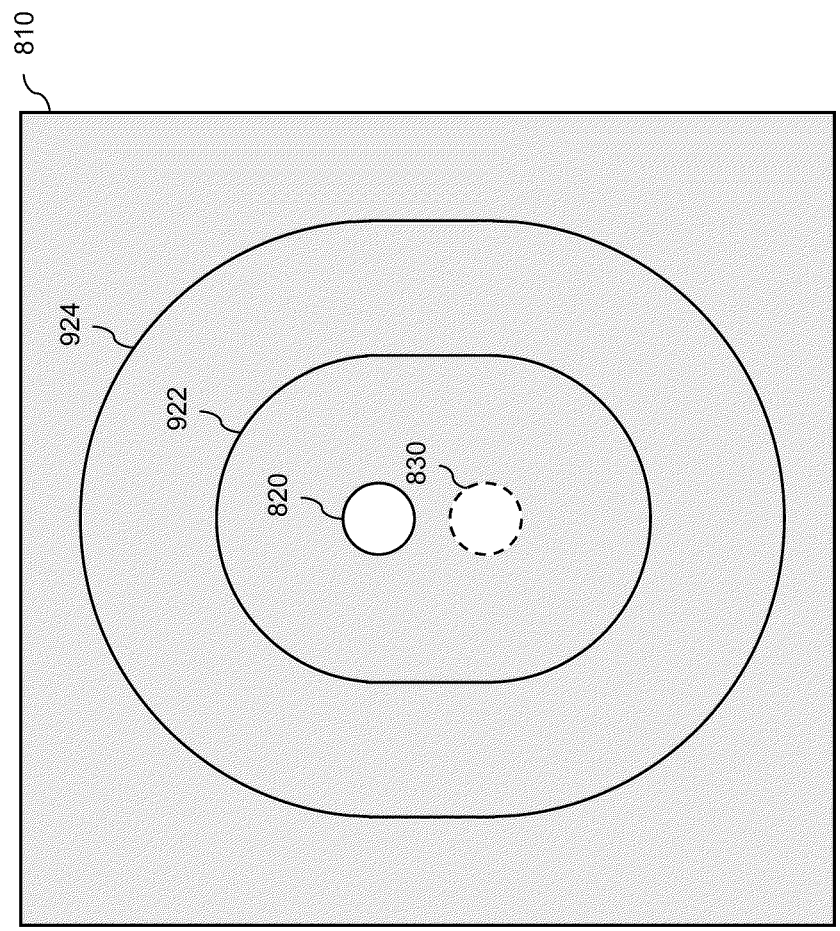
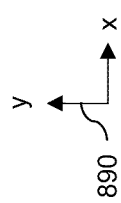
Fig. 9A

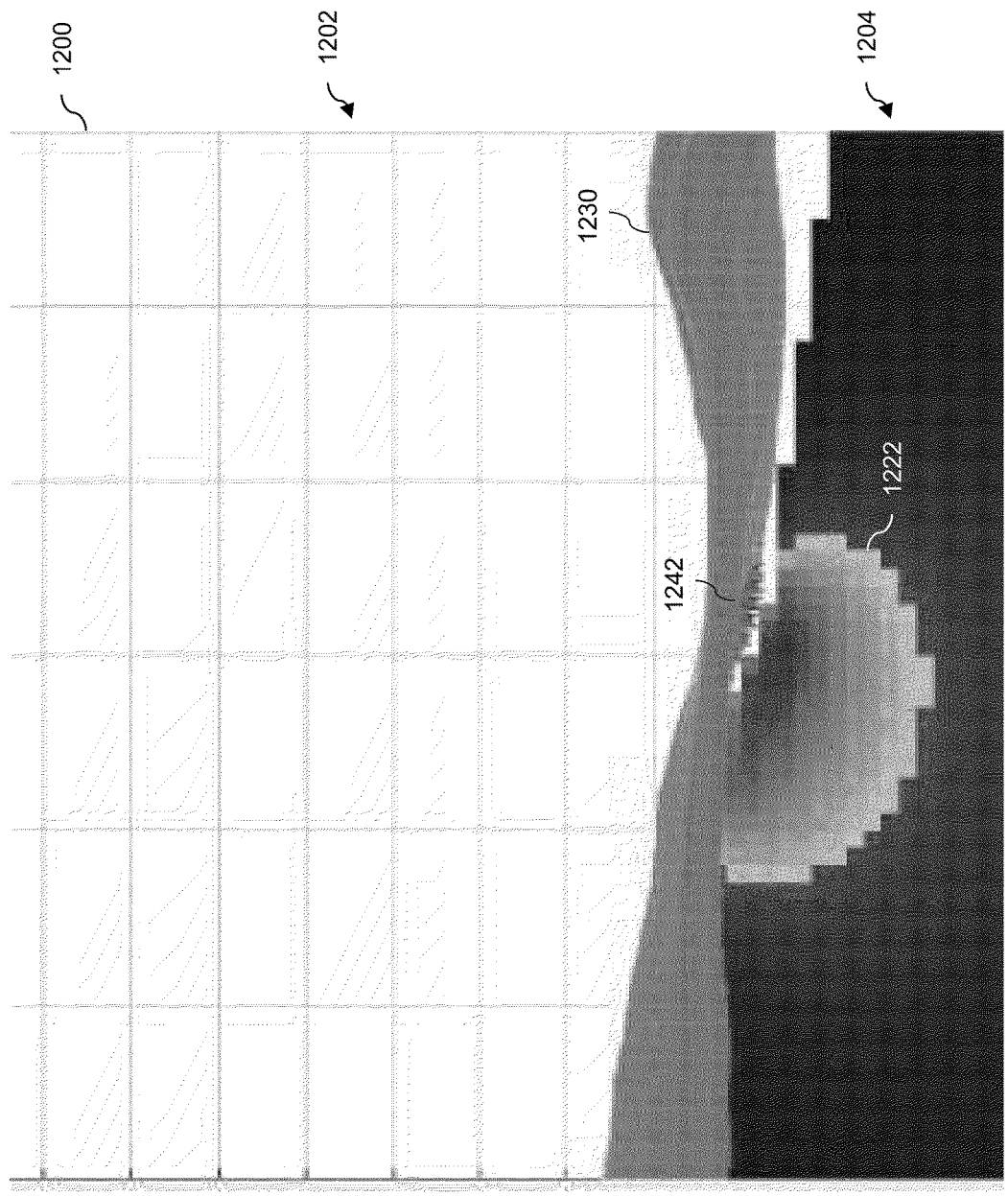

ULTRASOUND IMAGING FOR VISUALIZATION AND QUANTIFICATION OF MITRAL REGURGITATION

CROSS-REFERENCE TO PRIOR APPLICATIONS

This application is the U.S. National Phase application under 35 U.S.C. § 371 of International Application No. PCT/EP2022/072497, filed on Aug. 10, 2022, which claims the benefit of European Patent Application No. 21191602.8, filed on Aug. 17, 2021. These applications are hereby incorporated by reference herein.

FIELD OF THE INVENTION

The present disclosure relates generally to ultrasound imaging for visualizing and quantifying blood flow within a patient. In particular, the blood flow through a complex mitral orifice is modeled based on ultrasound data as a convolution of a simple flow model with multiple source points. The resulting flow model is compared to acquired three-dimensional color Doppler data and adjusted to ensure accuracy.

BACKGROUND OF THE INVENTION

Ultrasound imaging is widely used in medical imaging and diagnosis. Three-dimensional color Doppler imaging measures the velocity of blood flow in a patient and conveys this information to the physician by showing different colors on a display. Color Doppler imaging is particularly useful in identifying regurgitation of blood at the mitral valve in a patient's heart. In a healthy heart, blood passes from the left atrium through the mitral valve into the left ventricle. As the heart contracts, the mitral valve closes to prevent blood from flowing back into the left atrium and the blood is forced from the left ventricle into the aorta and carried to the rest of the body. However, mitral regurgitation occurs when the mitral valve does not close completely allowing blood to flow from left ventricle back into the left atrium. This mitral regurgitation prevents the heart from pumping blood as efficiently as it should and can lead to severe symptoms.

For physicians to prescribe an appropriate treatment for mitral regurgitation, they must know the extent of the condition. Specifically, they must know the amount of blood that passes back into the left atrium, or the blood volume flow, and the size of the hole or orifice created when the mitral valve does not close completely. Both of these metrics are extremely difficult to accurately quantify with conventional methods. The prevailing method of quantifying blood flow through the mitral valve is the Proximal Isovelocity Surface Area (PISA) method. The PISA method approximates the mitral valve as a single pin hole in a flat, two-dimensional plane. However, because the mitral valve is not flat or two-dimensional, but is an irregular, dynamic or constantly moving, three-dimensional surface, and because the gaps created by the mitral valve during regurgitation are not a single pin hole, but complex shapes, the PISA method provides inaccurate measurements of both the volume flow through a mitral valve orifice and the area of the orifice. Other methods, such as the computational fluid dynamics method (CFD), provide more accurate measurements than the PISA method, but require heavy computational steps and are not practical for clinical use. Consequences of using current techniques of assessing and quantifying mitral regurgitation include lack of confidence in the measurement, highly variable results, processes that are too time-intensive to be practical, and unnecessary repetition of ultrasound examinations.

EP3692925A1 relates to a method for estimating a regurgitant flow based on an identified regurgitant orifice and uses a dynamic surface model and a flow convergence model.

EP2654569A1 relates to a method for quantifying flow rate and volume flow of mitral valve regurgitation and involves use of a modelled flow velocity field.

US 2019/125295 A1 relates to a method for detecting valves in ultrasound data, and detecting a flow therethrough.

SUMMARY OF THE INVENTION

Embodiments of the present disclosure are systems, devices, and methods for visualizing and quantifying mitral regurgitation. The present disclosure overcomes inaccuracies in the measurement of volume flow of blood through a leaking mitral valve and the area of orifices in a mitral valve by modelling the mitral valve as a three-dimensional surface and mitral valve orifices as actual complex shapes throughout systole. In particular, an ultrasound imaging system acquires three-dimensional (3D) color Doppler volume data of a mitral valve throughout the cardiac cycle. The system then identifies the ultrasound image frames showing systole, or the phase in which the mitral valve is closed and blood is pushed out of the left ventricle of the heart. For each of these identified frames, a 3D model of the mitral valve and orifice is generated. The orifice is modelled as many small holes positioned next to each other in the shape of the orifice. The flow models from each of these small holes are then combined resulting in a flow model through the orifice as a whole. This flow model is then compared to the actual ultrasound image. The system then makes adjustments to the model to make the flow model match the actual flow seen in the image to ensure accuracy. The flow volume and orifice area may then be calculated based on the adjusted flow model. This process is repeated for every ultrasound image showing systole.

This process advantageously provides a physician with accurate blood volume flow data and orifice area data at every point in time throughout the systolic phase of the cardiac cycle. In addition, because the process is completed for each ultrasound image frame, it accounts for the constantly changing shape of the mitral valve, and the regurgitant orifice, throughout systole. This process also accounts for the complex shapes of different orifices created by mitral valves not closing completely, including when multiple orifices may be created. By integrating the measurements of blood volume flow throughout the systolic phase, the physician is also provided with a precise measurement of the total volume of blood which leaked from the ventricle into the atrium during a single systolic phase. With all of this information, the physician is enabled to make more a much more accurate decision of appropriate remedial measures to address the condition. In addition, computations of this procedure are fast enough to be completed in real-time and compatible for patient-side use. The procedures are also non-invasive, meaning they could be readily used to quantify mitral regurgitation before, during, or after mitral repair procedures. A physician may then immediately know the success of a repair after a procedure without waiting to finish a treatment or after any recovery time. Additionally, the flow vs. time data computed by the algorithm(s) described herein communicate to the physician whether the flow is early-, late- or holo-systolic, which can reveal additional information about the mechanism of the regurgitation. This information has previously not been automatically available to physicians, and instead required manual, tedious tracing to deduce this kind of time-based information.

According to an exemplary aspect, an ultrasound system is provided. The ultrasound system includes an array of acoustic elements configured to obtain ultrasound data, wherein the ultrasound data comprises Doppler data and B-mode data; a processor circuit configured for communication with the array of acoustic elements and a display, wherein the processor circuit is configured to: receive the ultrasound data obtained by the array of acoustic elements, wherein the ultrasound data is representative of mitral regurgitation associated with an orifice in a mitral valve; generate a model of the mitral valve based on the B-mode data; generate a model of the orifice based on the model of the mitral valve and the Doppler data; output a first screen display to the display, wherein the first screen display comprises: the model of the mitral valve; and the model of the orifice in the model of the mitral valve; generate a blood flow model of the mitral regurgitation based on the model of the orifice; compare the blood flow model to the Doppler data; change the model of the orifice such that the blood flow model is changed to match the Doppler data, wherein the model of the orifice is changed to have at least one of a different shape, a different position, or a different orientation; and output a second screen display to the display, wherein the second screen display comprises: an ultrasound image based on the ultrasound data; and the model of the orifice in the ultrasound image, wherein the model of the orifice in the second screen display comprises at least one of the different shape, the different position, or the different orientation.

The model of the mitral valve may comprise an anatomic model of the mitral valve. The generating of the model of the orifice may comprise identifying, based on the Doppler data, an orifice within the anatomic model of the mitral valve. In some embodiments, the processor circuit may be configured to identify the orifice based on a velocity in the Doppler data exceeding a threshold velocity. In some embodiments, to modify the shape of the orifice, the processor circuit is configured to modify the threshold velocity. In some embodiments, to modify the position of the orifice, the processor circuit is configured to move the orifice along a perpendicular direction in the model of the mitral valve. In some embodiments, the processor circuit is configured to output a 3D isovelocity surface based on the blood flow model of the mitral regurgitation.

In some embodiments, the first and/or the second screen display comprises a first ultrasound image based on the ultrasound data and a second ultrasound image based on the ultrasound data, wherein the first ultrasound image is oriented along a first axis, and wherein the second ultrasound image is oriented along a different, second axis. In some embodiments, the first ultrasound image and the second ultrasound image (i) are based on multiplanar reformation (MPR), or (ii) comprise side views. In some embodiments, the first axis and the second axis correspond to at least one of the shape or the modified shape of the orifice. In some embodiments, the processor circuit is configured to determine at least one of a flow volume, an orifice area, or a confidence metric, and wherein the processor circuit is configured to output, to the display, a graphical representation based on at least one of the flow volume, the orifice area, or the confidence metric.

According to an exemplary aspect, an ultrasound system is provided. The ultrasound system includes a processor circuit configured for communication with an array of acoustic elements and a display, wherein the processor circuit is configured to: receive ultrasound data obtained by the array of acoustic elements, wherein the ultrasound data is representative of mitral regurgitation associated with an orifice in a mitral valve; identify, based on the ultrasound data, the orifice within an anatomic model of the mitral valve; output a first graphical representation of the orifice; modify at least one of a shape, a position, or an orientation of the orifice based on a comparison between a model of the mitral regurgitation and the ultrasound data; and output a second graphical representation of the orifice with at least one of the modified shape, the modified position, or the modified orientation.

In some embodiments of any of the aspects of the invention, the ultrasound data comprises Doppler data, and the processor circuit is configured to identify the orifice within the anatomic model of the mitral valve based on the Doppler data. In some aspects, the processor circuit is configured to identify the orifice based on a velocity in the Doppler data exceeding a threshold velocity. In some aspects, to modify the shape of the orifice, the processor circuit is configured to modify the threshold velocity. In some aspects, to modify the position of the orifice, the processor circuit is configured to move the orifice along a perpendicular direction in the anatomic model of the mitral valve. In some aspects, the processor circuit is configured to generate the model of the mitral regurgitation based on the orifice. In some aspects, the ultrasound data comprises Doppler data, and the processor circuit is configured to modify at least one of the shape, the position, or the orientation of the orifice based on the comparison between the model of the mitral regurgitation and the Doppler data. In some aspects, the processor circuit is configured to generate a further model of the mitral regurgitation based on the orifice with at least one of the modified shape, the modified position, or the modified orientation. In some aspects, the processor circuit is configured to output a 3D isovelocity surface based on the model of the mitral regurgitation. In some aspects, the processor circuit is configured to output a first ultrasound image based on the ultrasound data and a second ultrasound image based on the ultrasound data, the first ultrasound image is oriented along a first axis, and the second ultrasound image is oriented along a different, second axis. In some aspects, the first ultrasound image and the second ultrasound image are based on multiplanar reformation (MPR). In some aspects, the first ultrasound image and the second ultrasound image comprise side views. In some aspects, the first axis and the second axis correspond to at least one of the shape or the modified shape of the orifice. In some aspects, the processor circuit is configured to determine at least one of a flow volume, an orifice area, or a confidence metric, and the processor circuit is configured to output, to the display, a graphical representation based on at least one of the flow volume, the orifice area, or the confidence metric.

According to an exemplary aspect, an ultrasound system is provided. The ultrasound system includes a processor circuit configured for communication with an array of acoustic elements and a display, wherein the processor circuit is configured to: receive Doppler ultrasound data obtained by the array of acoustic elements, wherein the Doppler ultrasound data is representative of mitral regurgitation associated with an orifice in a mitral valve; generate a model of the mitral regurgitation based on a model of the orifice; output a screen display to the display, wherein the screen display comprises: a first ultrasound image comprising the Doppler ultrasound data; a graphical representation of the model of the mitral regurgitation overlaid on the first ultrasound image such that the model of the mitral regurgitation corresponds to the Doppler ultrasound data.

In some aspects, the graphical representation of the model of the mitral regurgitation comprises a graphical representation of a regurgitation flow distribution. In some aspects, the first ultrasound image comprises a two dimensional (2D) image, and the graphical representation of the regurgitation flow distribution comprises an isovelocity contour. In some aspects, the first ultrasound image comprises a three dimensional (3D) image, and the graphical representation of the regurgitation flow distribution comprises an isovelocity mesh. In some aspects, the graphical representation of the model of the mitral regurgitation comprises a graphical representation of a regurgitation flow field. In some aspects, a graphical representation of the regurgitation flow field comprises a vector. In some aspects, the graphical representation of the model comprises a graphical representation of an axis of a jet of the mitral regurgitation. In some aspects, the graphical representation of the model comprises a graphical representation of an axis normal to the mitral valve. In some aspects, the screen display 20 comprises a second ultrasound image, the first ultrasound image is oriented along the first axis, and the second ultrasound image is oriented along a different, second axis. In some aspects, the first ultrasound image and the second ultrasound image comprise side views. In some aspects, the first axis and the second axis correspond to a shape of the orifice. In some aspects, the graphical representation of the model comprises a graphical representation of a contour of the orifice. In some aspects, the first ultrasound image comprises a top view. In some aspects, the screen display further comprises a three-dimensional (3D) representation of the model of the mitral regurgitation.

According to an exemplary aspect, an ultrasound system is provided. The ultrasound system includes an array of acoustic elements configured to obtain ultrasound data, wherein the ultrasound data comprises Doppler data and B-mode data; a processor circuit configured for communication with the array of acoustic elements and a display, wherein the processor circuit is configured to: receive the ultrasound data obtained by the array of acoustic elements, wherein the ultrasound data is representative of mitral regurgitation associated with an orifice in a mitral valve; generate a model of the mitral valve; generate a model of the orifice based on the model of the mitral valve and the Doppler data; generate a blood flow model of the mitral regurgitation based on the model of the orifice; compare the blood flow model to the Doppler data; change the model of the orifice such that the blood flow model is changed to match the Doppler data; compute at least one of a blood flow volume or an orifice area based on at least one of the blood flow model or the model of the orifice; output a screen display to the display, wherein the screen display is based on two or more of: the ultrasound data, the model of the mitral valve, the model of the orifice, the blood flow model, the blood flow volume, or the orifice area.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which:

FIG. 8A is a diagrammatic view of flow through two holes in a plane, according to aspects of the present disclosure.

FIG. 9A is a diagrammatic view of flow through two holes in a plane, according to aspects of the present disclosure.

FIG. 12 is a diagrammatic view of virtual three-dimensional Doppler volume data corresponding to a model of a mitral valve, according to aspects of the present disclosure.

DETAILED DESCRIPTION OF EMBODIMENTS

Figure 1:
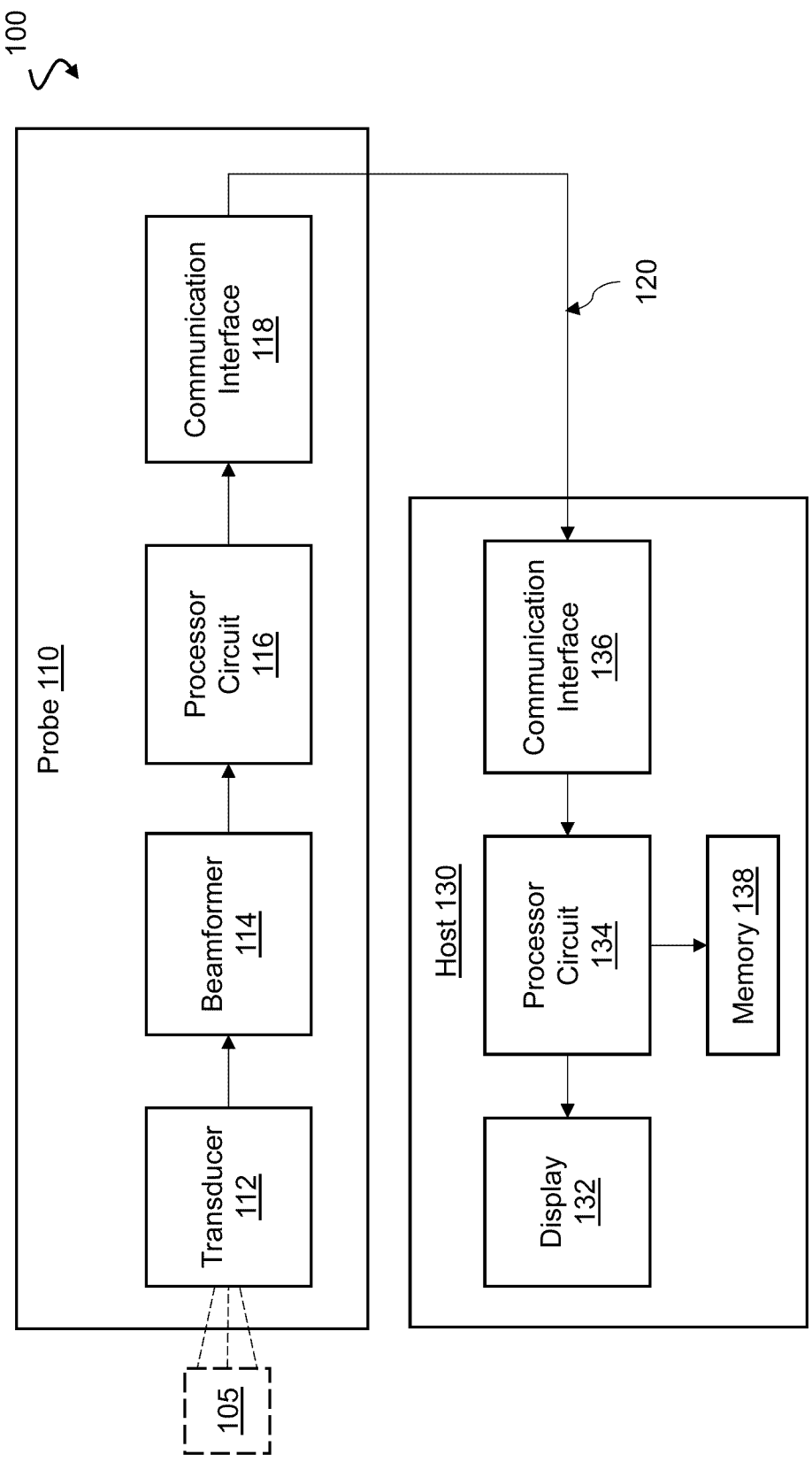
FIG. 1 is a schematic diagram of an ultrasound imaging system, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

The present disclosure describes a processor circuit that can detect a 3D orifice within a 3D anatomic model of the valve. The 3D anatomic model of the valve can be generated based on ultrasound data (e.g., B-mode ultrasound data) acquired by acoustic elements of an ultrasound imaging device. The processor circuit uses the 3D anatomic model of the valve to initiate a first determination of the orifice (e.g., shape, position, and/or orientation). The detected 3D orifice in the 3D model of the valve can be output to a display. Based on the initial detection of shape, position, and/or orientation of the orifice within the valve model, the processor circuit can calculate the regurgitant flow (e.g., the shape of the regurgitant flow) associated with that orifice. For example, the calculated regurgitant flow is representative of the blood flow upstream of the orifice. The processor circuit can compare the calculated regurgitant flow to the 3D Doppler ultrasound data. For example, the calculated regurgitant flow is compared to the portion of the 3D Doppler ultrasound data upstream of the orifice. The initial determination of the orifice within the valve model can be refined based on the comparison. For example, the shape, position, and/or orientation of the orifice within the valve model can be changed. The regurgitant flow can then be recalculated using the new shape, position, and/or orientation of the orifice. This updated regurgitant flow can be compared to the 3D Doppler ultrasound data to evaluate whether there is better match/correspondence, which indicates that the new shape, position, and/or orientation of the orifice within the valve is a more accurate representation of the actual orifice in the patient's valve. The processor circuit can iterate these steps (change orifice within valve model, recalculate regurgitant flow, compare regurgitant flow model to 3D Doppler ultrasound data) until the processor circuit determines a suitable match with the acquired 3D Doppler ultrasound data. The processor circuit can perform all of the steps for each frame of the 3D Doppler ultrasound data over time. The processor circuit can also output a display of the calculated regurgitant flow and/or the orifice on ultrasound images generated based on the 3D Doppler ultrasound data.

In some embodiments, aspects of the present disclosure can include features similar to those described in International Publication No. WO2020164955, filed Feb. 4, 2020, and titled "Methods and Systems for Valve Regurgitation Assessment." which is hereby incorporated by reference in its entirety.

FIG. 1 is a schematic diagram of an ultrasound imaging system 100, according to aspects of the present disclosure. The system 100 is used for scanning an area or volume of a patient's body. The system 100 includes an ultrasound imaging probe 110 in communication with a host 130 over a communication interface or link 120. The probe 110 may include a transducer array 112, a beamformer 114, a processor circuit 116, and a communication interface 118. The host 130 may include a display 132, a processor circuit 134, and a communication interface 136.

Probe 110 may be in any suitable form for any suitable ultrasound imaging application including both external and internal ultrasound imaging. In some embodiments, the probe 110 is an external ultrasound imaging device including a housing configured for handheld operation by a user. The transducer array 112 can be configured to obtain ultrasound data while the user grasps the housing of the probe 110 such that the transducer array 112 is positioned adjacent to and/or in contact with a patient's skin. The probe 110 is configured to obtain ultrasound data of anatomy within the patient's body while the probe 110 is positioned outside of the patient's body. In some embodiment, the probe 110 can be an external ultrasound probe, such as a transthoracic echocardiography (TTE) probe.

In other embodiments, the probe 110 can be an internal ultrasound imaging device and may comprise a housing configured to be positioned within a lumen of a patient's body, including the patient's esophagus, heart chamber, coronary vasculature, peripheral vasculature, or other body lumen. In some embodiments, the probe 110 may be an intravascular ultrasound (IVUS) imaging catheter, or an intracardiac echocardiography (ICE) catheter. In other embodiments, probe 110 may be a transesophageal echocardiography (TEE) probe.

The transducer array 112 emits ultrasound signals towards an anatomical object 105 of a patient and receives echo signals reflected from the object 105 back to the transducer array 112. The ultrasound transducer array 112 can include any suitable number of acoustic elements, including one or more acoustic elements and/or a plurality of acoustic elements. In some instances, the transducer array 112 includes a single acoustic element. In some instances, the transducer array 112 may include an array of acoustic elements with any number of acoustic elements in any suitable configuration. For example, the transducer array 112 can include between 1 acoustic element and 10000 acoustic elements, including values such as 2 acoustic elements, 4 acoustic elements, 36 acoustic elements, 64 acoustic elements, 128 acoustic elements, 500 acoustic elements, 712 acoustic elements, 1000 acoustic elements, 3000 acoustic elements, 7000 acoustic elements, and/or other values both larger and smaller. In some instances, the transducer array 112 may include an array of acoustic elements with any number of acoustic elements in any suitable configuration, such as a linear array, a planar array, a curved array, a curvilinear array, a circumferential array, an annular array, a phased array, a matrix array, a one-dimensional (1D) array, a 1.x dimensional array (e.g., a 1.5D array), or a two-dimensional (2D) array. The array of acoustic elements (e.g., one or more rows, one or more columns, and/or one or more orientations) can be uniformly or independently controlled and activated. The transducer array 112 can be configured to obtain one-dimensional, two-dimensional, and/or three-dimensional images of a patient's anatomy. In some embodiments, the transducer array 112 may include a piezoelectric microma-chined ultrasound transducer (PMUT), capacitive microma-chined ultrasonic transducer (CMUT), single crystal, lead zirconate titanate (PZT). PZT composite, other suitable transducer types, and/or combinations thereof.

The object 105 may include any anatomy, such as blood vessels, nerve fibers, airways, mitral leaflets, cardiac structure, abdominal tissue structure, appendix, large intestine (or colon), small intestine, kidney, liver, and/or any other anatomy of a patient. In some aspects, the object 105 may include at least a portion of a patient's large intestine, small intestine, cecum pouch, appendix, terminal ileum, liver, epigastrium, and/or psoas muscle. The present disclosure can be implemented in the context of any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood vessels, blood, chambers or other parts of the heart, abdominal organs, and/or other systems of the body. In some embodiments, the object 105 may include malignancies such as tumors, cysts, lesions. hemorrhages, or blood pools within any part of human anatomy. The anatomy may be a blood vessel. such as an artery or a vein of a patient's vascular system, including cardiac vasculature, peripheral vasculature, neural vasculature, renal vasculature, and/or any other suitable lumen inside the body. The anatomical object 105 may additionally include ventricles or atria. In addition to natural structures, the present disclosure can be implemented in the context of man-made structures such as, but without limitation, heart valves, stents, shunts, filters, implants and other devices.

The beamformer 114 is coupled to the transducer array 112. The beamformer 114 controls the transducer array 112, for example, for transmission of the ultrasound signals and reception of the ultrasound echo signals. In some embodiments, beamformer 114 may apply a time-delay to signals sent to individual acoustic transducers within an array in transducer 112 such that an acoustic signal is steered in any suitable direction propagating away from probe 110. The beamformer 114 may further provide image signals to the processor circuit 116 based on the response of the received ultrasound echo signals. The beamformer 114 may include multiple stages of beamforming. The beamforming can reduce the number of signal lines for coupling to the processor circuit 116. In some embodiments, the transducer array 112 in combination with the beamformer 114 may be referred to as an ultrasound imaging component.

The processor circuit 116 is coupled to the beamformer 114. The processor circuit 116 may also be described as a processor circuit or processor. Processor circuit 116 may include a central processing unit (CPU), a graphical processing unit (GPU), a digital signal processor (DSP), an application specific integrated circuit (ASIC), a controller, a field programmable gate array (FPGA) device, another hardware device, a firmware device, or any combination thereof configured to perform the operations described herein. The processor circuit 134 may also be implemented as a combination of computing devices, e.g., a combination of a DSP and a microprocessor, a plurality of microprocessors, one or more microprocessors in conjunction with a DSP core, or any other such configuration. The processor circuit 116 is configured to process the beamformed image signals. For example, the processor circuit 116 may perform filtering and/or quadrature demodulation to condition the image signals. The processor circuit 116 and/or 134 can be configured to control the array 112 to obtain ultrasound data associated with the object 105.

The communication interface 118 is coupled to the processor circuit 116. The communication interface 118 may include one or more transmitters, one or more receivers, one or more transceivers, and/or circuitry for transmitting and/or receiving communication signals. The communication interface 118 can include hardware components and/or software components implementing a particular communication protocol suitable for transporting signals over the communication link 120 to the host 130. The communication interface 118 can be referred to as a communication device or a communication interface module.

The communication link 120 may be any suitable communication link. For example, the communication link 120 may be a wired link, such as a universal serial bus (USB) link or an Ethernet link. Alternatively, the communication link 120 nay be a wireless link, such as an ultra-wideband (UWB) link, an Institute of Electrical and Electronics Engineers (IEEE) 802.11 WiFi link, or a Bluetooth link.

At the host 130, the communication interface 136 may receive the image signals. The communication interface 136 may be substantially similar to the communication interface 118. The host 130 may be any suitable computing and display device, such as a workstation, a personal computer (PC), a laptop, a tablet, or a mobile phone.

The processor circuit 134 is coupled to the communication interface 136. The processor circuit 134 may be implemented as a combination of software components and hardware components. The processor circuit 134 may include a central processing unit (CPU), a graphics processing unit (GPU), a digital signal processor (DSP), an application-specific integrated circuit (ASIC), a controller, a FPGA device, another hardware device, a firmware device, or any combination thereof configured to perform the operations described herein. The processor circuit 134 may also be implemented as a combination of computing devices, e.g., a combination of a DSP and a microprocessor, a plurality of microprocessors. one or more microprocessors in conjunction with a DSP core, or any other such configuration. The processor circuit 134 can be configured to generate image data from the image signals received from the probe 110. The processor circuit 134 can apply advanced signal processing and/or image processing techniques to the image signals. In some embodiments, the processor circuit 134 can form three-dimensional (3D) volume image from the image data. In some embodiments, the processor circuit 134 can perform real-time processing on the image data to provide a streaming video of ultrasound images of the object 105. In some aspects, the processor circuit 134 may further perform various calculations relating to a region of interest within the patient's body. These calculations may then be displayed to the sonographer or other user via display 132.

The display 132 is coupled to the processor circuit 134. The display 132 may be a monitor or any suitable display. The display 132 is configured to display the ultrasound images, image videos, and/or any imaging information of the object 105.

The host 130 may include a memory 138, which may be any suitable storage device, such as a cache memory (e.g., a cache memory of the processor circuit 134), random access memory (RAM). magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, solid state drives, other forms of volatile and non-volatile memory, or a combination of different types of memory. The memory 138 can be configured to store patient files relating to a patient's medical history, history of procedures performed, anatomical or biological features, characteristics, or medical conditions associated with a patient, computer readable instructions, such as code, software, or other application, as well as any other suitable information or data.

Figure 2:
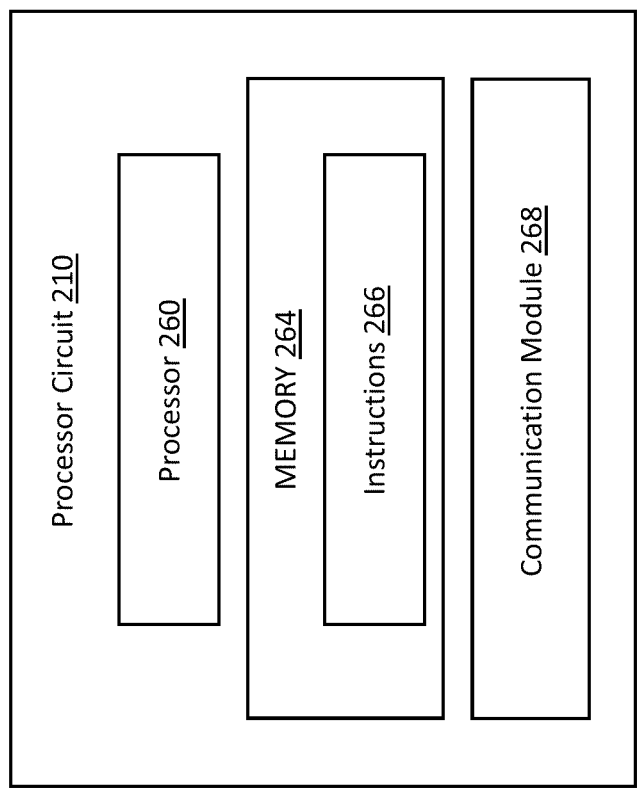
FIG. 2 is a schematic diagram of a processor circuit, according to aspects of the present disclosure

FIG. 2 is a schematic diagram of a processor circuit, according to aspects of the present disclosure. The processor circuit 210 may be implemented in the processing system 106 of FIG. 1. In an example, the processor circuit 210 may be in communication with the intraluminal imaging device 102, the x-ray imaging system 109, and/or the display 108 within the system 100. The processor circuit 210 may include a processor and/or communication interface. One or more processor circuits 210 are configured to execute the operations described herein. As shown, the processor circuit 210 may include a processor 260, a memory 264, and a communication module 268. These elements may be in direct or indirect communication with each other, for example via one or more buses.

The processor 260 may include a CPU, a GPU, a DSP, an application-specific integrated circuit (ASIC), a controller, an FPGA, another hardware device, a firmware device, or any combination thereof configured to perform the operations described herein. The processor 260 may also be implemented as a combination of computing devices, e.g., a combination of a DSP and a microprocessor, a plurality of microprocessors, one or more microprocessors in conjunction with a DSP core, or any other such configuration.

The memory 264 may include a cache memory (e.g., a cache memory of the processor 260), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 264 includes a non-transitory computer-readable medium. The memory 264 may store instructions 266. The instructions 266 may include instructions that. when executed by the processor 260, cause the processor 260 to perform the operations described herein with reference to the probe 110 and/or the processing system 106 (FIG. 1). Instructions 266 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 268 can include any electronic circuitry and/or logic circuitry to facilitate direct or indirect communication of data between the processor circuit 210, the probe 110, and/or the display or monitor 108.

In that regard, the communication module 268 can be an input/output (I/O) device. In some instances, the communication module 268 facilitates direct or indirect communication between various elements of the processor circuit 210 and/or the probe 110 (FIG. 1) and/or the processing system 106 (FIG. 1). For example, the processor circuit 210 may be in communication with the probe 110, the transducers 112 or array 112, and/or the display 132.

Figure 3:
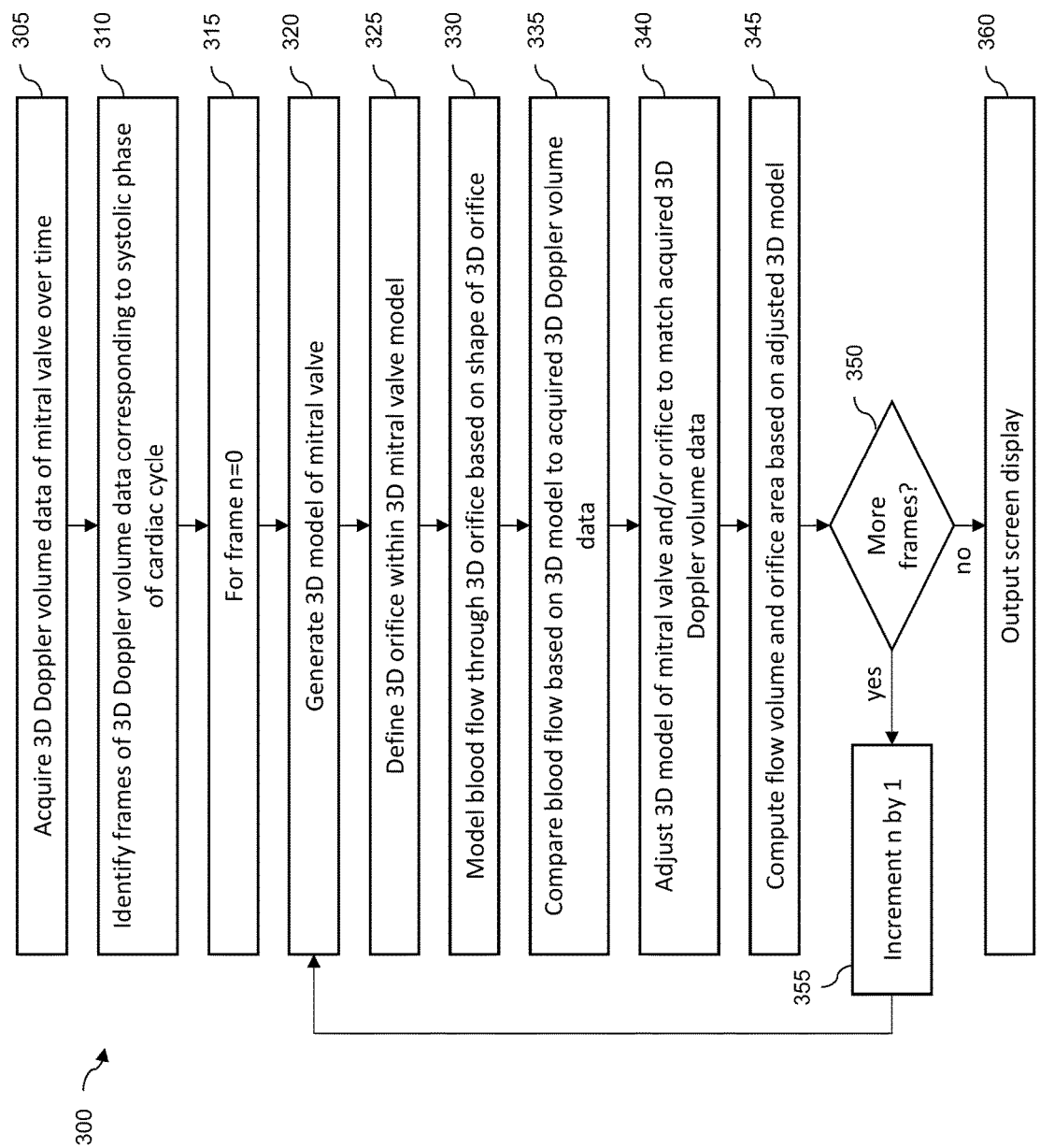
FIG. 3 is a flow diagram for a method of measuring mitral regurgitation, according to aspects of the present disclosure.

FIG. 3 is a flow diagram for a method of measuring mitral regurgitation, according to aspects of the present disclosure. The method 300 will be described with reference to FIGS. 4-22. As illustrated, the method 300 includes a number of enumerated steps, but embodiments of the method 300 may include additional steps before, after, or in between the enumerated steps. In some embodiments, one or more of the enumerated steps may be omitted, performed in a different order, or performed concurrently. The steps of the method 300 can be carried out by any suitable component within the system 100 and all steps need not be carried out by the same component. In some embodiments, one or more steps of the methods 300 can be performed by, or at the direction of, a processor circuit of the system 100 (e.g., the processor circuit 210 of FIG. 2), including, e.g., the processor 260 or any other component.

Figure 4:
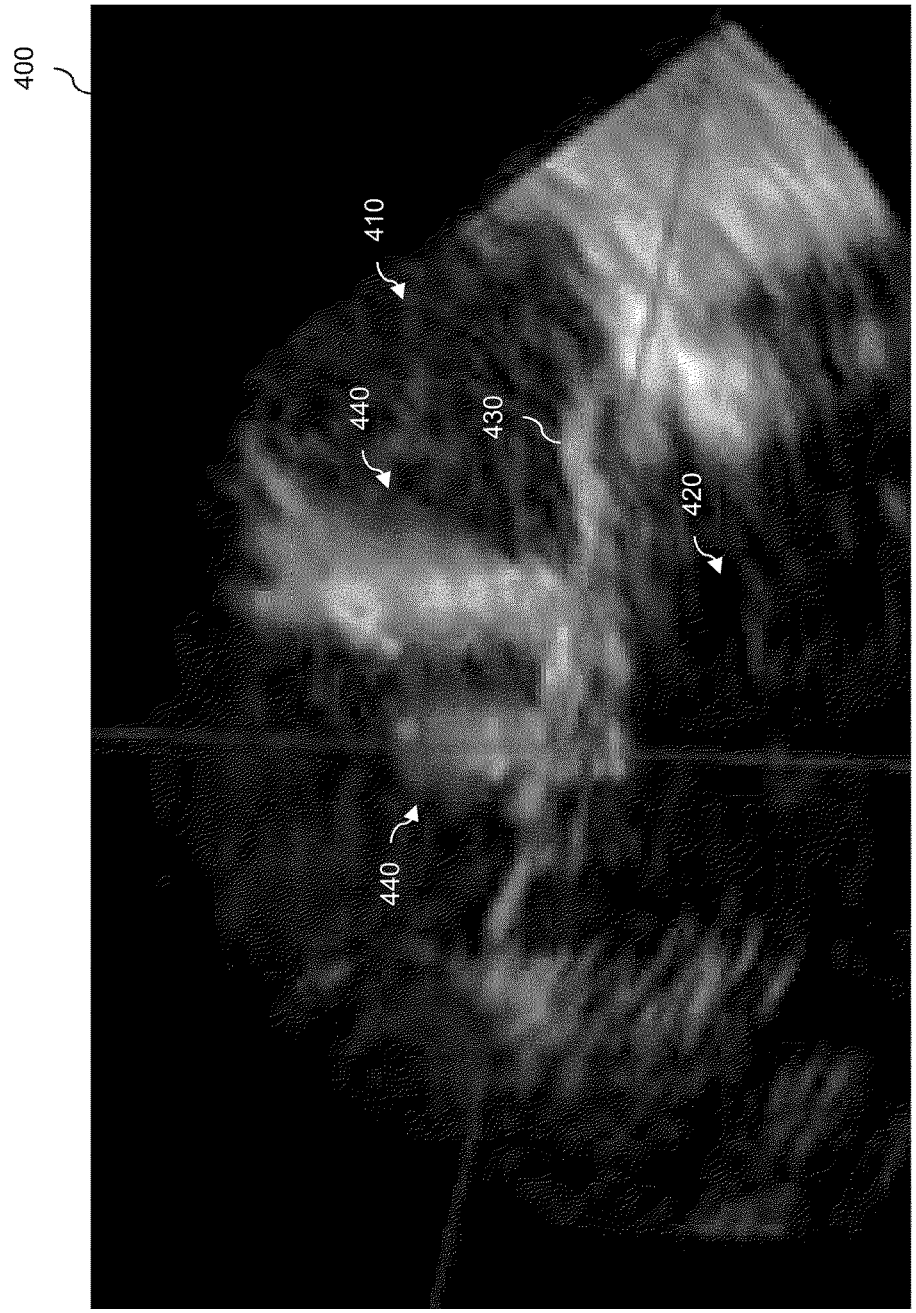
FIG. 4 is a diagrammatic view of a cross-section of a three-dimensional color Doppler ultrasound image, according to aspects of the present disclosure.

At step 305, the method 300 includes acquiring a three-dimensional (3D) Doppler volume data of a mitral valve over time. The 3D Doppler volume data may also be referred to as 3D color Doppler data, color Doppler data, 3D color Doppler temporal sequences, or any other suitable terms. The 3D ultrasound data over time can also be referenced as 4D ultrasound data, with three spatial dimensions and time as the fourth dimension. The 3D Doppler volume data may be of any suitable form. In some embodiments, the 3D Doppler volume data may be a color 3D Doppler image, such as the one shown in FIG. 4. In some embodiments, the system 100 may also receive 2D or 3D B-mode ultrasound data, in addition to Doppler data, throughout an imaging procedure, as also shown in FIG. 4. For example, the Doppler data acquisition and the B-mode data acquisition may be interleaved, such that they are being acquired over the same period of time. Any of this data may be received by the processor circuit 210 (FIG. 2). FIG. 4 is a diagrammatic view of a cross-section of a three-dimensional color Doppler ultrasound image 400, according to aspects of the present disclosure. The image 400 shown in FIG. 4 may be acquired by the probe 110 of the ultrasound system 100 during an ultrasound imaging procedure. The image 400, or any other image obtained during such a procedure, may show various anatomies of a patient's heart. For example, the image 400 of FIG. 4 shows a cross-sectional side view of a mitral valve 430 within a patient's heart.

The image 400 may illustrate various features of the patient's heart. For example, the image 400 may illustrate a left ventricle 420 and a left atrium 410 separated by a mitral valve 430. During systole of the cardiac phase, the mitral valve 430 may close allowing pressure within the left ventricle 420 to build and move blood out of the left ventricle 420 into the aorta and to the rest of the patient's body. During systole, if the mitral valve 430 does not close completely, blood may flow from the left ventricle 420 back into the left atrium 410 resulting in reduced efficiency of the heart. This back flow of blood is seen in the image 400 as well as the regurgitant flow 440. This regurgitant flow 440 may also be described as jets, back flow, or by any other suitable term. The method 300 described herein advantageously provides an accurate and efficient method of quantifying this regurgitant flow 440.

Referring again to FIG. 3, at step 310, the method 310 includes identifying frames of the 3D Doppler volume data corresponding to the systolic phase of the cardiac cycle. As described, the regurgitant flow 440 described with reference to FIG. 4 occurs during the systolic phase of the cardiac cycle. To identify the frames during which mitral regurgitation may occur, all ultrasound image frames showing the mitral valve during systole must be identified. The step 310 will be described with reference to FIG. 5, which is a schematic diagrammatic view of a series of ultrasound images 510 received by the ultrasound imaging system, according to aspects of the present disclosure.

Figure 5:
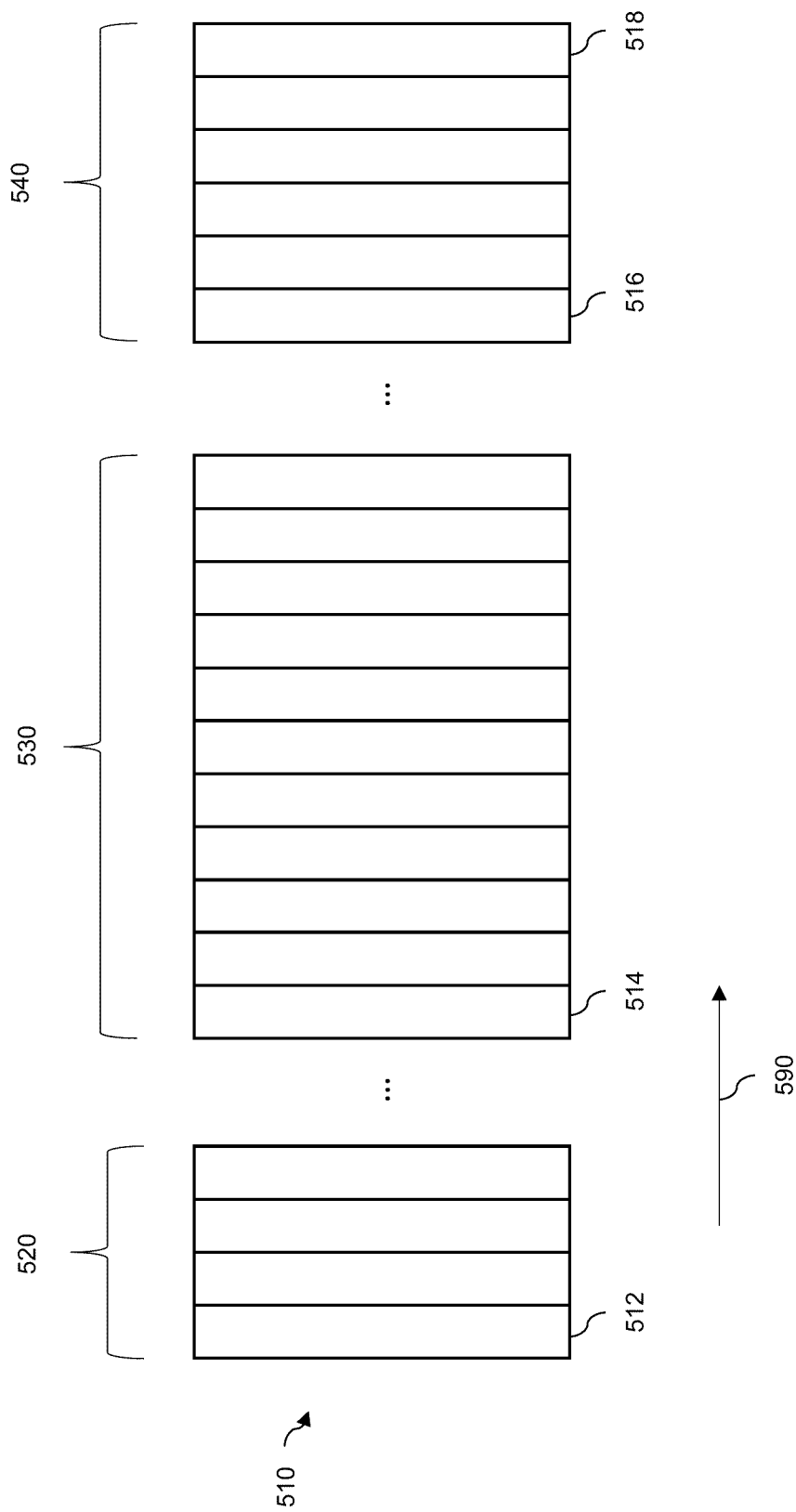
FIG. 5 is a schematic diagrammatic view of a series of ultrasound images received by the ultrasound imaging system, according to aspects of the present disclosure.

In FIG. 5, a series of ultrasound images 510 are shown in chronological order. For example, the ultrasound image 512 may be the first ultrasound image acquired of the images 510 shown in FIG. 5. Similarly, the image 518 may be the last ultrasound image acquired of the images 510 shown in FIG. 5. This chronological relationship between the images 510 is additionally illustrated by the arrow 590, indicating that the position of each image 510 corresponds to the time at which the images 510 were acquired relative to one another. It shows that the images at the left region of FIG. 5 were acquired earlier and that time progress to the right such that the images 510 at the right region of FIG. 5 were acquired later.

The images 510 identified by the indicator 520 may correspond to ultrasound images depicting the mitral valve 430 (FIG. 4) acquired during diastole. By contrast, the images 510 identified by the indicator 530 may correspond to ultrasound images acquired during systole. And finally, the images 510 identified by the indicator 540 may correspond to images acquired during diastole. At the step 310, the images shown by the indicator 530 may be identified.

The ultrasound images 510 shown by the indicator 530 may be identified by any suitable manner. For example, a user of the system 100 may identify the images shown by the indicator 530 corresponding to the systolic phase. In such an embodiment, the system 100 may display to the user the images 510 in series. The system 100 may then receive an input from the user identifying an image 514 at which the systolic phase begins. Similarly, the system may receive a user input identifying the image 516 at which the diastolic phase begins following the systolic phase.

Alternatively, the system 100 may automatically identify the ultrasound images 510 corresponding to the systolic phase shown by the indicator 530. The system 100 may identify these images 510 by any suitable method. In some embodiments, a processor circuit can receive a user input identifying the systolic frames manually provided by a user at a user interface device in communication with the processor circuit. In some embodiments, the processor circuit can execute software, such as the 4D MV-Assessment software available from TomTec, to acquire the systolic portion of the acquisition. In some embodiments, the system 100 may use various image processing techniques to determine that the mitral valve 430 (FIG. 4) has closed. These techniques may include edge identification, pixel-by-pixel analysis to determine transition between light pixels and dark pixels, filtering, or any other suitable techniques to identify relevant structures or locations within the received image frames. The system 100 may also use various machine learning techniques to recognize the ultrasound image frame 512 at which the mitral valve closes and systole begins.

Similar image processing or machine learning techniques may be used to identify the image frame 516 at which systole ends and diastole begins. For example, the system 100 may determine that the aortic valve of the heart has closed signaling the end of systole.

Referring again to FIG. 3, step 315 of the method 300 includes identifying the first ultrasound image 512 of systole identified at step 310 and shown by the indicator 530 in FIG. 5. This first ultrasound image 512 may be designated to correspond to an iterative counter, n. For example, for the first ultrasound image 512 of systole, the system 100 may assign an iterative counter n=0. As will be explained in more detail in the description of step 355, each of the steps 320 through 345 may be completed for each ultrasound image 510 showing systole of the cardiac phase. At the completion of steps 320 through 345, the iterative counter, n, may be incrementally increased by a value of one, directing the system to perform the steps 320 through 345 with the next ultrasound image 510 chronologically acquired in the set of images corresponding to systole.

At step 320, the method 300 includes generating a 3D model of the mitral valve shown in the selected image 510. Step 320 of the method 300 will be described with reference to FIG. 6, which is a diagrammatic view of a model 630 of a mitral valve, according to aspects of the present disclosure. A model of the mitral valve may be generated by any suitable method. For example, the processor circuit 210, may be configured to generate a model of the mitral valve based on the ultrasound data acquired at step 305 of the method 300. In that regard, an anatomic model of the mitral valve can be extracted from the B-mode ultrasound data. The model of the mitral valve may be three-dimensional or two-dimensional. The model of the mitral valve may be referenced as a dynamic model in that the model is generated over time because it is generated for each image frame of the 3D ultrasound data. For example, the model may be generated by defining meshes corresponding to the valve surface. Generating the 3D model of one or a plurality of regions of the heart, such as the mitral valve, may include some features similar to those described in U.S. Pat. No. 10,729, 406, which is hereby incorporated by reference in its entirety. In some embodiments, utilizing the model of the mitral valve advantageously avoids a user input identifying the mitral valve in the 3D ultrasound data, which can be subject to user error and/or inexperience. In step 320, the model can be generated automatically, without a user input, in some embodiments.

Figure 6:
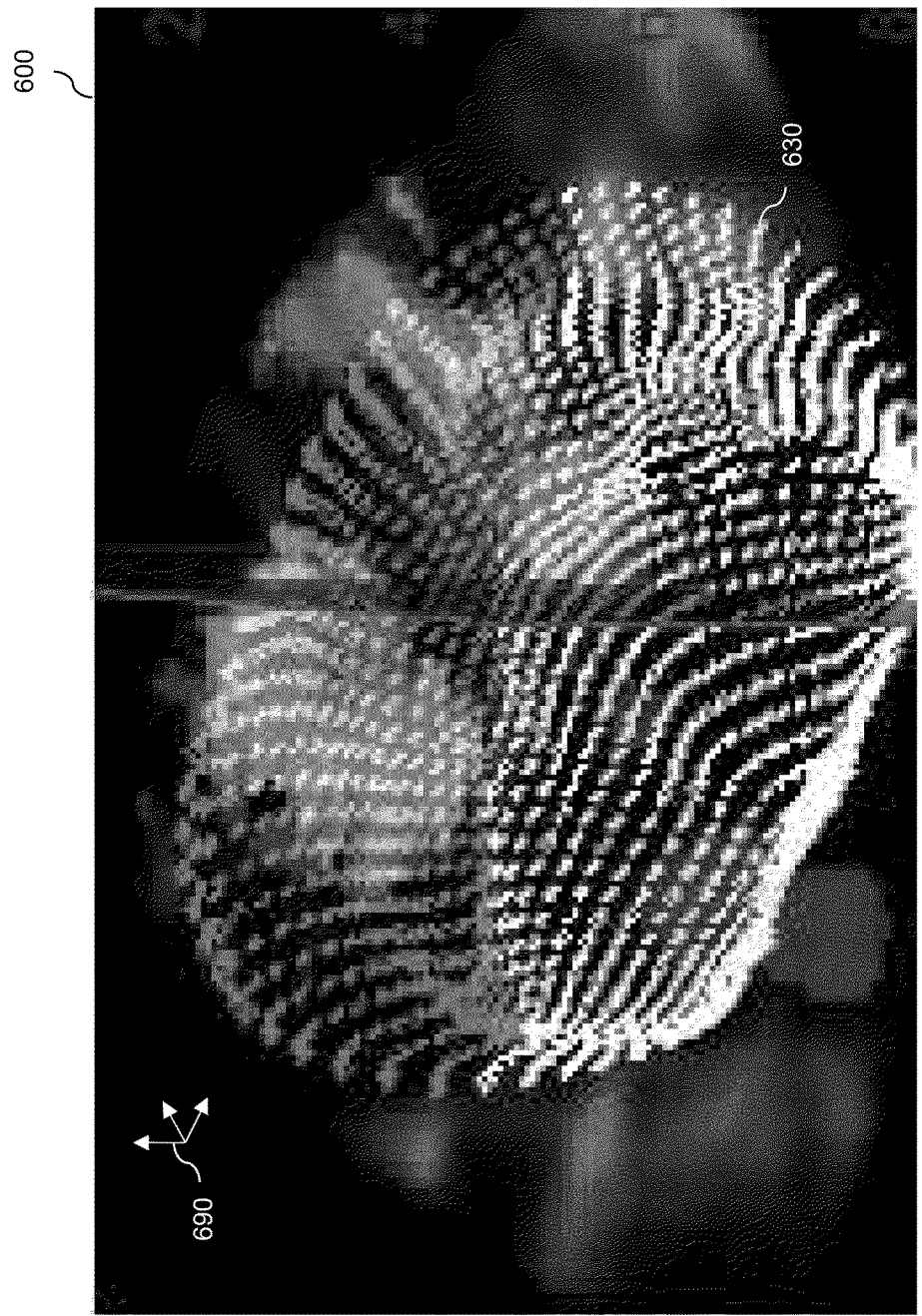
FIG. 6 is a diagrammatic view of a model of a mitral valve, according to aspects of the present disclosure.

As shown by the axes 690 in FIG. 6, the model 630 of the mitral valve is three-dimensional. In some embodiments, the model of the mitral valve may be referenced as a structural model, geometric model, or spatial model. Current methods of estimating regurgitant flow through a mitral valve assume that the mitral valve acts as an infinite two-dimensional plane. However, the mitral valve in various patients is neither infinite or two-dimensional. Rather, as shown by model 630 of FIG. 6, the mitral valve includes irregularities in three-dimensions and terminates at the walls of the left ventricle and/or atrium. The three-dimensional model 630 disclosed herein more accurately reflects the actual geometry of the mitral valve leading to more accurate measurements of regurgitant flow. In that regard, the orifice is described as a collection of points/small orifices (e.g., source points) located on the three-dimensional mitral valve model. For each of those points/small orifices, the associated flow model is a three dimensional flow field, and the complete flow model is the convolution of this flow model with all the source points. As a result of the three-dimensional location of those source points (and the fact that they are not located on a plane as in the PISA approximation), the flow model resulting from the convolution is much more complex and is a much better estimation of the actual flow field.

Referring back to FIG. 3, step 325 of the method 300 includes defining the 3D orifice within the 3D mitral valve model. In that regard, the 3D orifice can be defined (e.g., shape, position, and/or orientation) within the 3D mitral valve model. For example, the 3D orifice model can be part of the 3D mitral valve model. In some embodiments, to accurately model the upstream and downstream blood flow through an orifice in a leaking mitral valve, the size, shape, and location of the orifice must be determined. Orifices of the mitral valve may be of complex shapes including, for example, slit-like. round, non-round, or of any other shape. In addition, there may be one or multiple orifices created by a mitral valve failing to close completely. The principles described with reference to step 325 accounts for all of these types of orifices as will be described. For example, the processor circuit may generate a 3D or 2D model of the mitral valve and/or the orifice. Step 325 will be described with reference to FIG. 7, which is a diagrammatic view of a cross-section of a three-dimensional color Doppler ultrasound image of a mitral valve during a systolic phase, according to aspects of the present disclosure. The model of the orifice may be referenced as a dynamic model in that the model is generated over time because it is generated for each image frame of the 3D ultrasound data. In some embodiments, because the method 300 utilizes a model of the mitral valve, e.g., in order to define the orifice, registration of the valve and/or the orifice in the 3D Doppler ultrasound images over time can be avoided. This advantageously eliminates image stabilization, image segmentation, image registration, and/or image tracking step(s) associated with the mitral valve and/or the orifice in the 3D Doppler ultrasound images over time that may otherwise be needed, without the 3D mitral valve model. Use of the 3D mitral valve model and extraction of the orifice from the 3D mitral valve model provides a more accurate shape of the orifice from which the regurgitant flow model can be determined, as described below. The 3D mitral valve model can be automatically tracked with the 4D MV-Assessment software available from TomTec.

Figure 7:
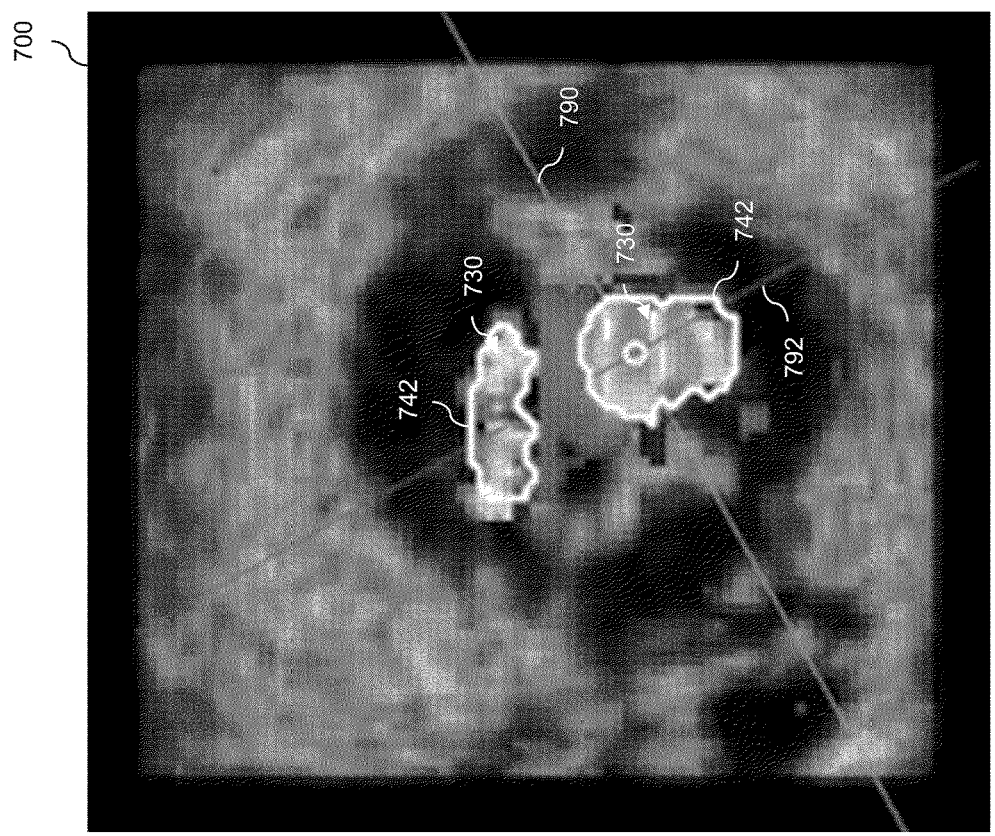
FIG. 7 is a diagrammatic view of a cross-section of a three-dimensional color Doppler ultrasound image of a mitral valve during a systolic phase, according to aspects of the present disclosure.

The image 700 shown in FIG. 7 may display a top view of a mitral valve. For example, the view of the mitral valve from within the left atrium. From this perspective, during systole, if a mitral valve is leaking or allowing regurgitant blood flow from the ventricle into the atrium. 3D color Doppler data may identify such movement of blood. Specifically, regions of greater blood velocity may correspond to regions of an orifice or an opening in the mitral valve allowing blood to pass from the ventricle to the atrium. Accordingly, the orifice within the 3D model of the valve can be determined using the color Doppler ultrasound data, while the 3D model of the valve itself was determined from B-mode ultrasound data. Both the color Doppler and B-mode ultrasound data can be acquired in the 3D Doppler volume data over time from step 305.

To determine which regions of the image 700 correspond to the orifice and which correspond to the mitral valve, the measured velocity of each part of the image may be compared to a velocity threshold. Any sections of the image denoting a velocity exceeding the velocity threshold may be classified as part of the orifice. While those sections that do not meet or exceed the velocity threshold are classified as part of the mitral valve. As shown in the image 700 regions of blood flow with a velocity exceeding the velocity threshold may be identified by the indicators 742 outlining the locations of the orifices. The color data 730 within the indicators 742 show a velocity exceeding the threshold velocity.

In some embodiments, the processor circuit can identify the orifice location and/or orifice boundary automatically by computing the smallest region of ultrasound color flow convergence. In some embodiments, the system 100 may identify the locations of the orifice(s) of a mitral valve in response to a user input. For example, as user may identify the regions of the image 700 corresponding to the orifice(s) of the mitral valve. In some embodiments, the user may select any location within the regions showing an orifice, as shown by the indicators 742, and the system 100 may automatically identify the orifice and generate the indicators 742 in response. The system may identify the orifice regions by the velocity threshold method previously discussed, or by other methods, such as through the image processing or machine learning techniques mentioned previously. An orifice of the mitral valve may also be referred to as an annulus. The orifice(s) 742 identified may be referred to as models. For example, the outlines of the orifices shown in FIG. 7 may be a model generated by the processor circuit 210 (FIG. 2) of the orifices. The orifice models may be two-dimensional or three-dimensional. The orifice models may also be referenced as structural models, geometric models, or spatial models. The model of the orifice(s) may be generated based on the model of the mitral valve (FIG. 6) and/or the B-mode or Doppler data obtained at step 305 of the method 300 (FIG. 3).

Referring again to FIG. 3, at step 330, the method 300 includes modeling the blood flow through the three-dimensional orifice based on the shape of the orifice. In some embodiments, the blood flow through the orifice may also be based on the shape of the 3D mitral valve because the orifice is part of the 3D mitral valve model. The blood flow model may also be three-dimensional. Step 330 will be described with reference to FIGS. 8-12. To model blood flow through the orifice of the mitral valve during systole, the orifice may be defined as the combination of multiple source points distributed on the orifice surface. Because the flow of a liquid through a single source point may be readily and accurately determined, modeled and measured, the convolution of the calculated flow from multiple source points positioned adjacent to one another allows the system to accurately determine the flow through more complex orifices, such as the orifice of the mitral valve. This principle will be described in more detail with reference to FIGS. 8A, 8B, 9A, and 9B below. The model of the mitral valve, orifice, and blood flow upstream of the orifice are new descriptors of mitral regurgitation assessment, extracting the morphology and the dynamics of the regurgitation leading to more accurate quantification.

Figure 8B:
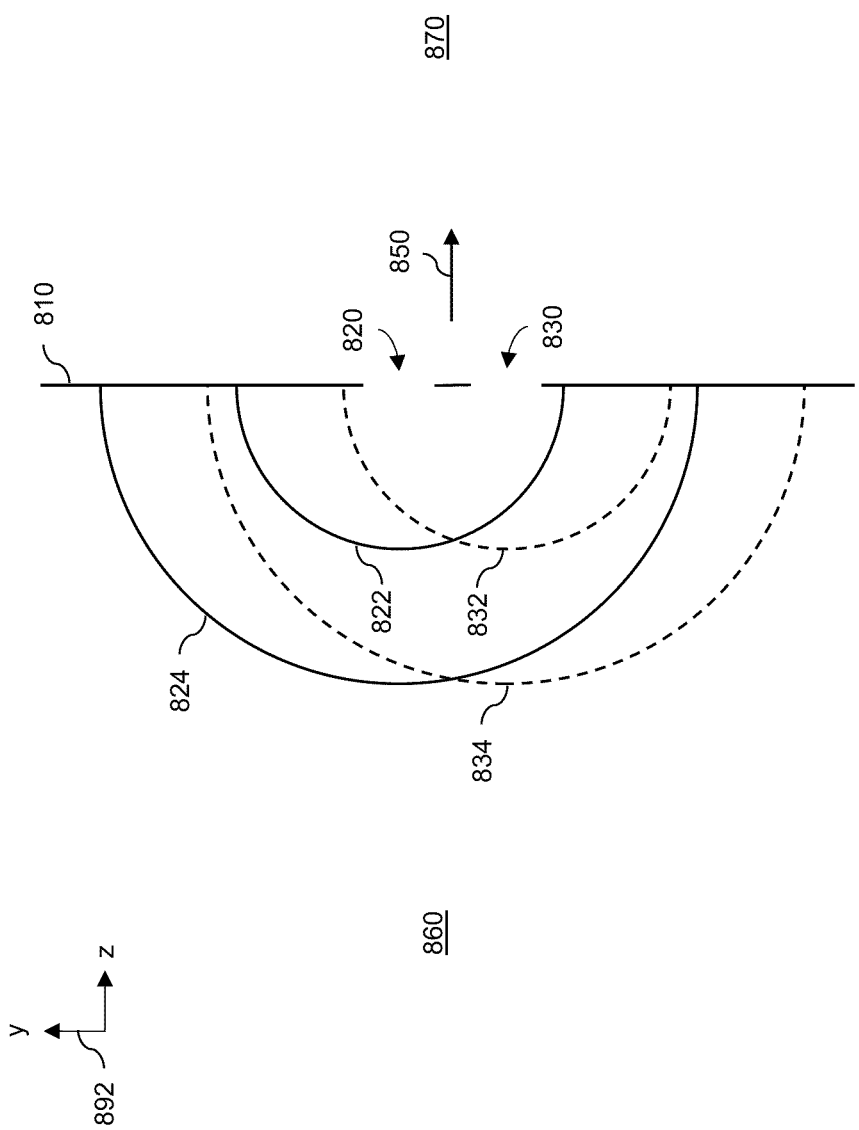
FIG. 8B is a diagrammatic view of flow through two holes in a plane, according to aspects of the present disclosure.

FIG. 8A is a diagrammatic view of flow through two holes in a plane, according to aspects of the present disclosure. As an example, a plane 810 is given. The plane 810 may be a two-dimensional infinite plane. The plane 810 may be oriented so as to extend infinitely along the x and y axes as shown by the axes 890. An additional x axis may extend in a direction perpendicular to both the x and y axes, as will be described in greater detail with reference to FIG. 8B.

Two holes, or orifices, hole 820 and hole 830, are positioned within the plane 810. A liquid, such as blood or any other liquid, may pass from one side of the plane 810 to the other through the two holes 820 and 830. Isovelocity curves are shown in FIG. 8A positioned around each of the holes 820 and 830. For example, positioned around the hold 820 is an isovelocity curve 822 and an isovelocity curve 824. The isovelocity curves may represent the velocity of the fluid as it approaches and passes through the holes. For example, as the fluid approaches the hole 820, it may accelerate reaching a maximum velocity as it passes through the hole 820. As a result, the fluid positioned at the isovelocity curve 824 may be of a constant velocity at all points along the curve 824. In addition, although the curve 824 is shown as a two-dimensional curve along the plane 810, the isovelocity curve is a three-dimensional hemispheric shaped shell representing all points within the fluid surrounding the hole 820 of the same velocity. Similarly, the isovelocity curve 822 positioned around the hole 820 may also represent a three-dimensional hemispheric shell representing all points within the fluid surrounding the hole 820 of the same velocity, although the velocity at the points shown by the curve 822 may be greater than the velocity shown by the curve 824 because the fluid accelerates as it approaches the hole 820.

If the radius 828, or the distance from the isovelocity curve 822 to the center of the hole 820 may be determined, the surface area of the shell illustrated by the curve 822 may be determined by $2\pi r^2$ where r is the radius 828. In addition, if the velocity of the fluid associated with the isovelocity curve 822, or the aliasing velocity, is known, it may be multiplied by the surface area of the curve 822 to provide a measurement of the flow of the fluid through the hole 820 as a unit of volume per unit of time. This same calculation may be made with respect to the curve 824 to provide the same result. For a pin point source, the vector flow upstream of the orifice towards the point may be proportional to $1/r^2$. The flow field may then derive from the velocity potential P, where $$\vec{V} = \vec{\nabla}(P) \quad (1)$$

with P=1/r.

To apply this principles to irregular orifices that are not single source points, the orifice may be modeled as multiple source points. For example, the flow model may be expressed as the convolution product of the point source distribution with the hemispheric solution. In some embodiments, a scalar convolution rather than a 3D vectorial convolution using the velocity potential may be used to increase the speed and efficiency of the process. This velocity potential may then be differentiated to get the complete vector field associated with the complex orifice. For example, as shown in FIG. 8A, an additional hole 830 may be positioned adjacent to the hole 820. The flow of fluid through these two holes may be very similar to the flow of fluid through a small vertical slit of a similar shape to the two holes 820 and 830 shown in FIG. 8A. To determine the flow through the two holes shown and/or a similar corresponding slit, the same calculations may be made for the hole 830. For example, an isovelocity curve 832 is shown positioned around the hole 830 and an isovelocity curve 834 is shown positioned around the curve 832. Assuming the hole 830 is identical in size and shape as the hole 820, the isovelocity curve 832 will be identical to the isovelocity curve 822. Specifically, the isovelocity curve 832 may represent a three-dimensional hemispheric shell representing all points within the fluid surrounding the hole 830 of the same velocity. The velocity of the fluid along the curve 832 may be identical to the velocity of the fluid along the curve 822. The curve 834 may similarly be identical to the curve 824. As shown in FIG. 9A, the surface area, velocity, and flow calculations described with reference to the hole 820 may be determined for the hole 830. The surface area, velocity, and flow calculations from both the hole 820 and 830 may be convolved producing a single model representing the surface area, velocity, and flow of combined orifice regurgitation. The convolved flow model is computed by combining the contributions of the two holes 820, 830. For example, $$\vec{V}_{total} = \vec{V}_{hole820} + \vec{V}_{hole830} \quad (2)$$

Then, the isovelocity shells 922, 924 (FIG. 9A) can be determined using the convolved flow model.

FIG. 8B is a diagrammatic view of flow through two holes in a plane, according to aspects of the present disclosure. As shown by the z-y axes 892, FIG. 8B may illustrate the same plane 810, holes 820 and 830, and isovelocity curves 822, 824, 832, and 834 as described in FIG. 8A but from along a different axis. As shown in FIG. 8B, the isovelocity curves 822, 824, 832, and 834 extend along the z-axis away from the face of the plane 810. The isovelocity curves are observed upstream of the orifices 820 and 830. As shown by the arrow 850, fluid in this particular example may flow from the left of the plane 810 as illustrated in FIG. 8B to the right of the plane 810. In the example of a mitral valve, the region 860, upstream of the holes 820 and 830 where the isovelocity curves are observed, may represent the left ventricle of the heart while the region 870, downstream of the holes 820 and 830 may represent the left atrium.

FIG. 9A is a diagrammatic view of flow through two holes in a plane, according to aspects of the present disclosure. As illustrated in FIG. 9A and previously mentioned with reference to FIG. 8A, the flow models corresponding to the holes 820 and 830 respectively may be combined so as to produce a new flow model corresponding to both the holes 820 and 830 treated as a single orifice. Then the isovelocity curves 922 and 924 can be determined using the new flow model. The isovelocity curves 922 and 924 may exhibit similar characteristics as the isovelocity curves 822, 824, 832, and 834 described with reference to FIGS. 8A and 8B. For example, the isovelocity curve 922 may represent a three-dimensional shell surrounding the orifice defined by the holes 820 and 830 with fluid along the shell being of the same velocity. The isovelocity curve 924 may also be a three-dimensional shell with the fluid along it being the same velocity but of a lesser velocity than that of the curve 922.

By convolving the models of flow of the holes 820 and 830, a single model of an irregular orifice that is more complex than a single point source may be created which accurately predicts the behavior of fluid. Based on this new model, the surface areas of various new isovelocity curves such as the curves 922 and 924 may be calculated, the velocity of the fluid may be determined, and an accurate measurement of flow through the new complex orifice may be accurately measured.

Figure 9B:
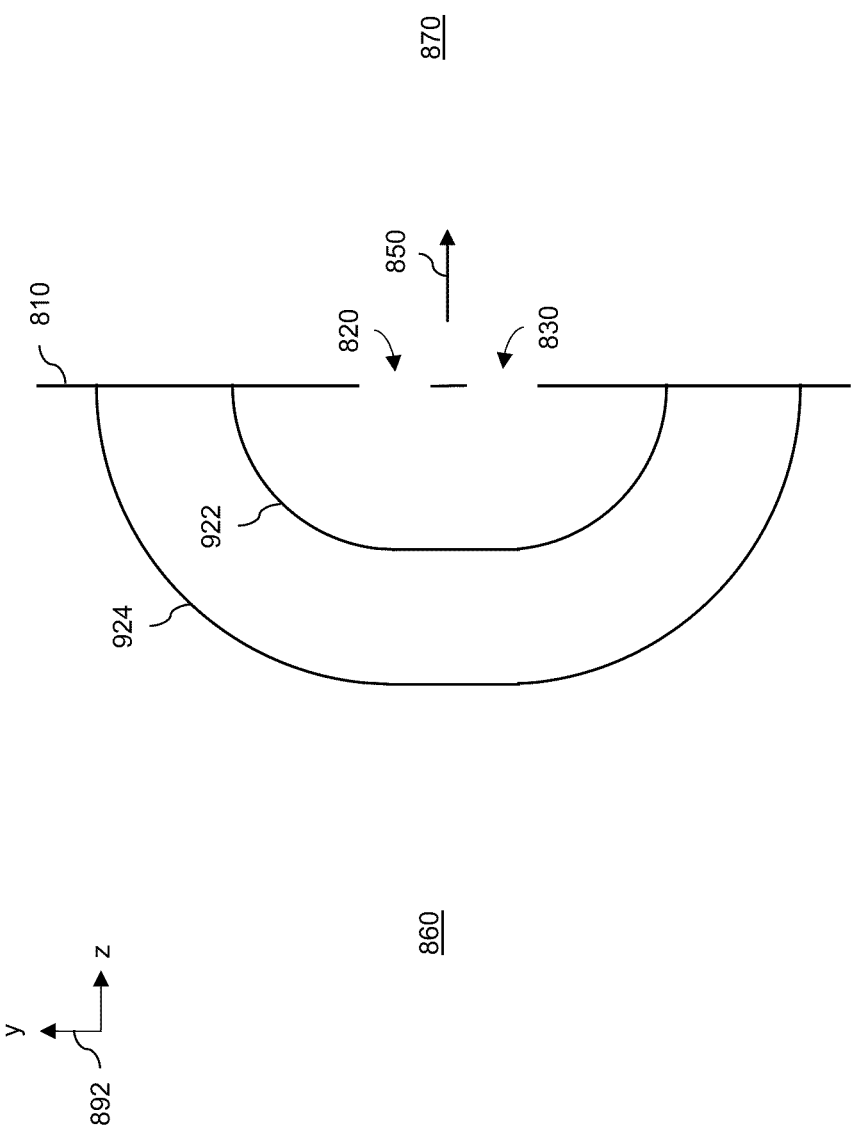
FIG. 9B is a diagrammatic view of flow through two holes in a plane, according to aspects of the present disclosure.

FIG. 9B is a diagrammatic view of flow through two holes in a plane, according to aspects of the present disclosure. Similar to FIG. 8B, as shown by the z-y axes 892. FIG. 9B illustrates the same plane 810, holes 820 and 830, and isovelocity curves 922 and 924 as described in FIG. 9A but from along a different axis. The isovelocity curves 922 and 924 shown in FIG. 9B extend along the z-axis upstream from the face of the plane 810.

Figure 10:
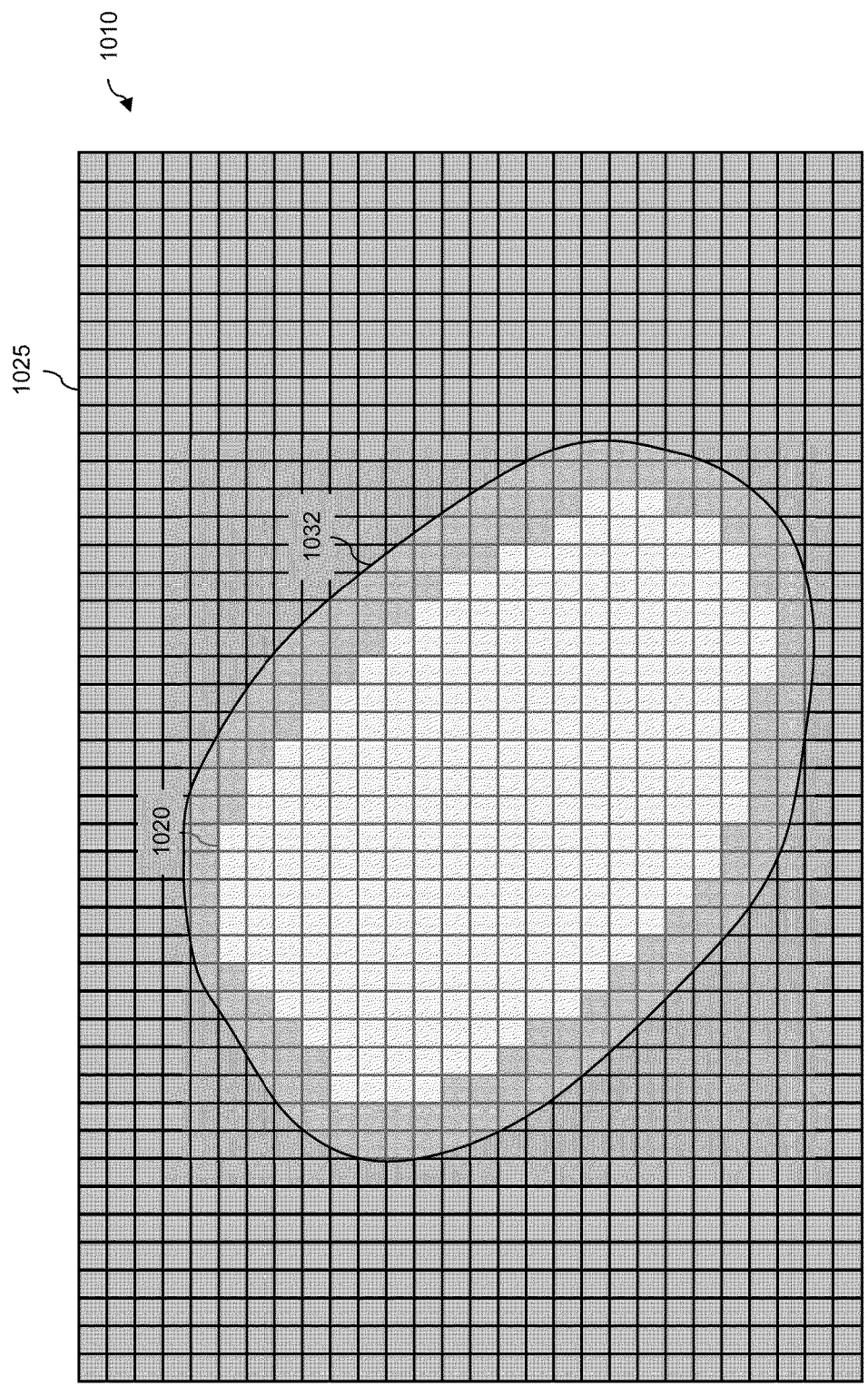
FIG. 10 is a diagrammatic view of a model of an orifice of a mitral valve, according to aspects of the present disclosure.

FIG. 10 is a diagrammatic view of a model 1010 of an orifice of a mitral valve, according to aspects of the present disclosure. The model 1010 may be a two-dimensional or three-dimensional model. Referring to FIG. 3, at step 330, the blood flow through a complex orifice of a mitral valve may be modeled using the principles described with reference to FIGS. 8A, 8B, 9A, and 9B. Specifically, an orifice may be partitioned into numerous single point sources positioned adjacent to each other. FIG. 10 illustrates a complex orifice modeled as numerous point sources 1020 positioned in a grid-like manner next to one another. The model may include numerous points within a grid. The point sources making up the grid of the model 1010 may be classified by the system 100 as valve points 1025 (i.e. points corresponding to the surface of the mitral valve) or orifice points 1020 (i.e. points corresponding to the orifice through which regurgitant blood flows). A separate model determining the surface area of isovelocity curves, velocity of blood, and flow may be determined for each orifice point 1020. All models for each orifice point 1020 may then be convolved to create a single model representing surface area. velocity, and flow for the entire orifice. The resulting model may be a blood flow model or a model of the blood flow associated with the mitral regurgitation through an orifice, such as the orifice defined by the model 1010. This blood flow model may be a fluid model or fluid dynamics model and may include data such as isovelocity curves, surfaces, or meshes, flow vectors, or any other metrics or data. The blood flow model generated as described with reference to FIG. 10 may be two-dimensional or three-dimensional. As described with reference to FIG. 10, the blood flow model generated may be generated based on the orifice model (e.g., the model 742 of FIG. 7 or 1010 of FIG. 10). A single isovelocity curve 1032 corresponding to this combined single model is shown illustrated in FIG. 10. The isovelocity curve 1032 may represent the points in three-dimensional space around the orifice shown at which the fluid moving towards the orifice moves at the same velocity. It is understood that additional isovelocity curves may be included in addition to the curve 1032 surrounding or within the curve 1032 representing locations of different velocities.

In some embodiments, the processor circuit can output a graphical representation of the initial orifice model 1020. For example, display of the orifice model 1020 can be provided within the valve model 1010 (e.g., as a graphical overlay). Such a display can be associated with vena contracta area (VCA) or vena contracta width (VCW), which is narrowest area/width of the jet downstream of the orifice. This can be a region of clinical significance for a user that can be used to grade the severity of mitral regurgitation. In some embodiments, the graphical representation of the initial orifice model 1020 and/or the valve model 1010 (e.g., as a graphical overlay) can be displayed on an ultrasound image generated using the Doppler and/or B-model ultrasound data. The displayed initial orifice model can be referenced as the VCA or VCW orifice in some embodiments.

Figure 11A:
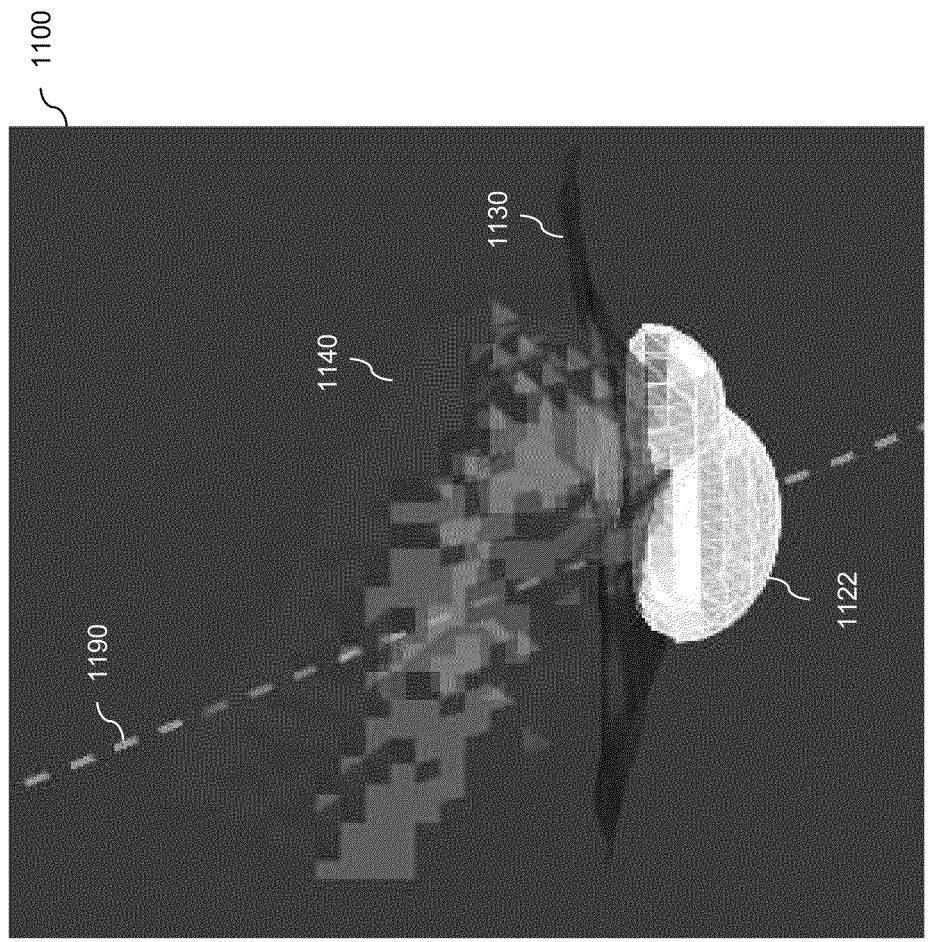
FIG. 11A is a diagrammatic view of a model of a mitral valve, upstream blood flow, and downstream blood flow, according to aspects of the present disclosure.

FIG. 11A is a diagrammatic view of a model 1110 of a mitral valve, upstream blood flow, and downstream blood flow, according to aspects of the present disclosure. FIG. 11A includes a depiction of the mitral valve 1130, an isovelocity surface or mesh 1122 shown upstream of the mitral valve 1130 and a jet 1140 downstream of the mitral valve 1130. The jet 1140 may be detected using 3D segmentation of Doppler/color ultrasound data based on velocity thresholding. The model of the mitral valve 1130, the isovelocity curves or surfaces 1122, and/or the jet 1140 may be either two-dimensional or three-dimensional. For example, they may be displayed in two-dimensions as cross-sections of three-dimensional models, or may be displayed in three-dimensions. In some embodiments, the model of the blood flow/mitral regurgitation is a fluid dynamics model, or a model of the flow of blood through a structural model of the valve and/orifice.

The model 1110 may be constructed by the system 100 by combining the model of the mitral valve as shown in the ultrasound image frame 510 (FIG. 5) with the model of the orifice and blood flow as described with reference to FIG. 10. For example, the isovelocity surface 1122 may be constructed using a similar technique as described with reference to the isovelocity curve 1032 of FIG. 10. The position of the isovelocity surface 1122 relative to the mitral valve 1130 may be determined based on the defined location and shape of the orifice within the mitral valve 1130 as described with reference to FIG. 7.

FIG. 11A also includes an orientation axis 1190. In an embodiment in which the model 1100 is displayed to a user of the system, the orientation axis 1190 may identify a jet main axis of the blood flow, a valve normal axis, or a perpendicular axis. In some embodiments, the axis 1190 may identify a center point of an orifice or any other features of the mitral valve, orifice, or blood flow. In the illustrated embodiment, the axis 1190 is an axis associated with the jet 1140. For example, the axis 1190 may illustrate the primary direction of blood flow for the jet 1140. The processor circuit can use the jet axis 1140 to automatically determine multi planar reformation or reconstruction viewing planes (MPRs) and/or cut planes for visualization. Clinically, the jet axis 1140 could be used by the physician to better understand the behavior of the blood flow.

Figure 11B:
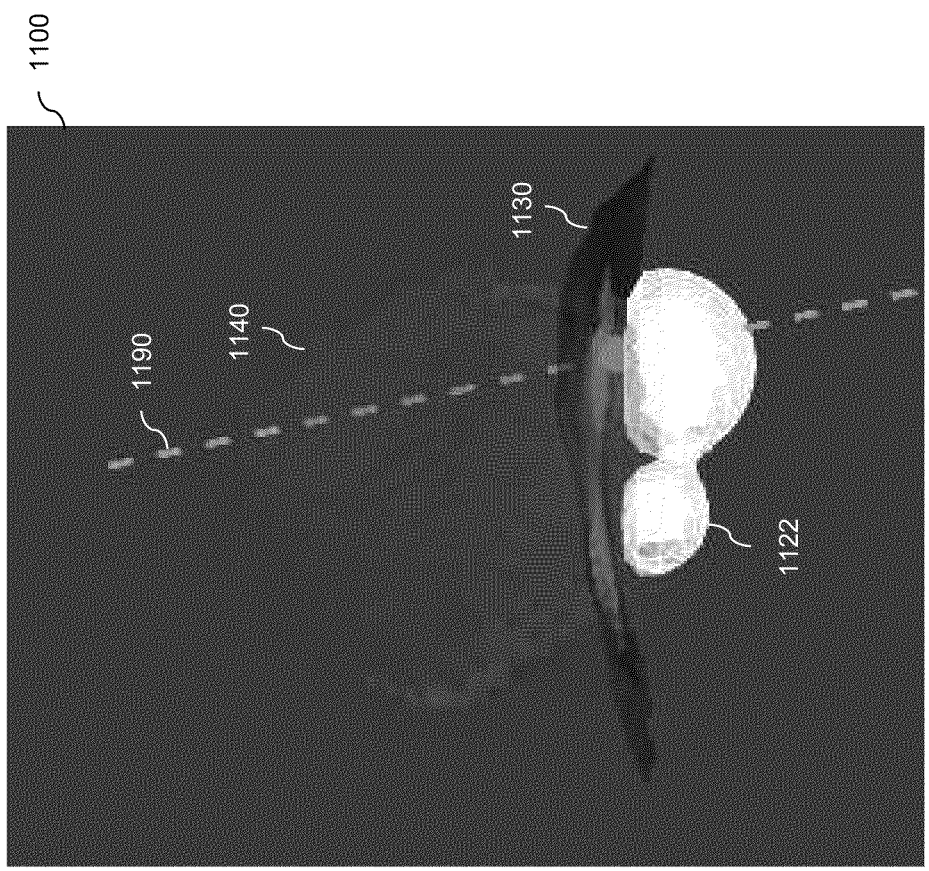
FIG. 11B is a diagrammatic view of a model of a mitral valve, upstream blood flow, and downstream blood flow, according to aspects of the present disclosure.

FIG. 11B is a diagrammatic view of the model 1110 of a mitral valve, upstream blood flow, and downstream blood flow, according to aspects of the present disclosure. As shown in FIG. 11B, the model 1100 may display the same mitral valve 1130, upstream isovelocity surfaces 1122, jet 1140, and axis 1190 as shown in FIG. 11A. However. FIG. 11B may display these elements from a different perspective. As shown, the model 1100 may be a three-dimensional model which may be viewed from various angles or across various cut planes. For example, the processor circuit may rotate or display the 3D model 1100 automatically (e.g., the model 1100 may be automatically rotated). In some embodiments, the model 1100 may be rotated in response to a user input. For example, the user may direct the system 100 to rotate the model 1100 via a mouse input, the user of in input button, a touch on a touch screen, or by any other suitable form of input.

FIG. 12 is a diagrammatic view of virtual three-dimensional Doppler volume data corresponding to a model of a mitral valve, according to aspects of the present disclosure. FIG. 12 may represent an alternative form of displaying the model and accompanying flow data described in FIG. 11. A virtual color image 1200 may be created by considering the scanning geometry and computing the velocity components aligned with the beam direction. The velocity scale may be adjusted to closely align with color doppler values. The flow may be computed based on the vector field through the orifice.

As shown in FIG. 12, a model 1200 may be generated. The model 1200 may be two-dimensional or three-dimensional. The model 1200 includes a model of the mitral valve 1230, a section of the orifice 1242, and a generated virtual reconstruction of 3D Doppler color data 1222. Also shown in FIG. 12 are two regions, an upstream region 1204 and a downstream region 1202. In the case of a mitral valve allowing regurgitant flow, the upstream region 1204 may correspond to a left ventricle and the downstream region 1202 may correspond to a left atrium.

The model of the mitral valve 1230 may be similar to the model 1130 described with reference to FIG. 11. It may be generated using techniques described with reference to FIG. 6. The orifice 1242 within the model 1230 is also shown, though it need not be. The shape, size, and orientation of the orifice 1242 may be determined using techniques described with reference to FIG. 7. Based on the flow data calculated for the orifice 1242 and mitral valve 1230 (i.e. surface area, velocity, and flow measurements), virtual 3D color Doppler data 1222 may be generated and displayed. 3D color Doppler displays to a user of the system different colors corresponding to the velocity of objects within an acquired ultrasound image. Because the velocities of the fluid at all points in three dimensions upstream of the orifice are known, different velocities may be assigned different colors to create virtual 3D color Doppler data 1222 as shown in FIG. 12. In that regard, virtual can refer to computed or calculated values based on the computed or calculated flow model. Creating virtual 3D color Doppler data 1222 may be useful in validating the model 1200 against actual acquired 3D color Doppler data corresponding to the patient's anatomy, as will be described in more detail in FIG. 13.

Figure 13:
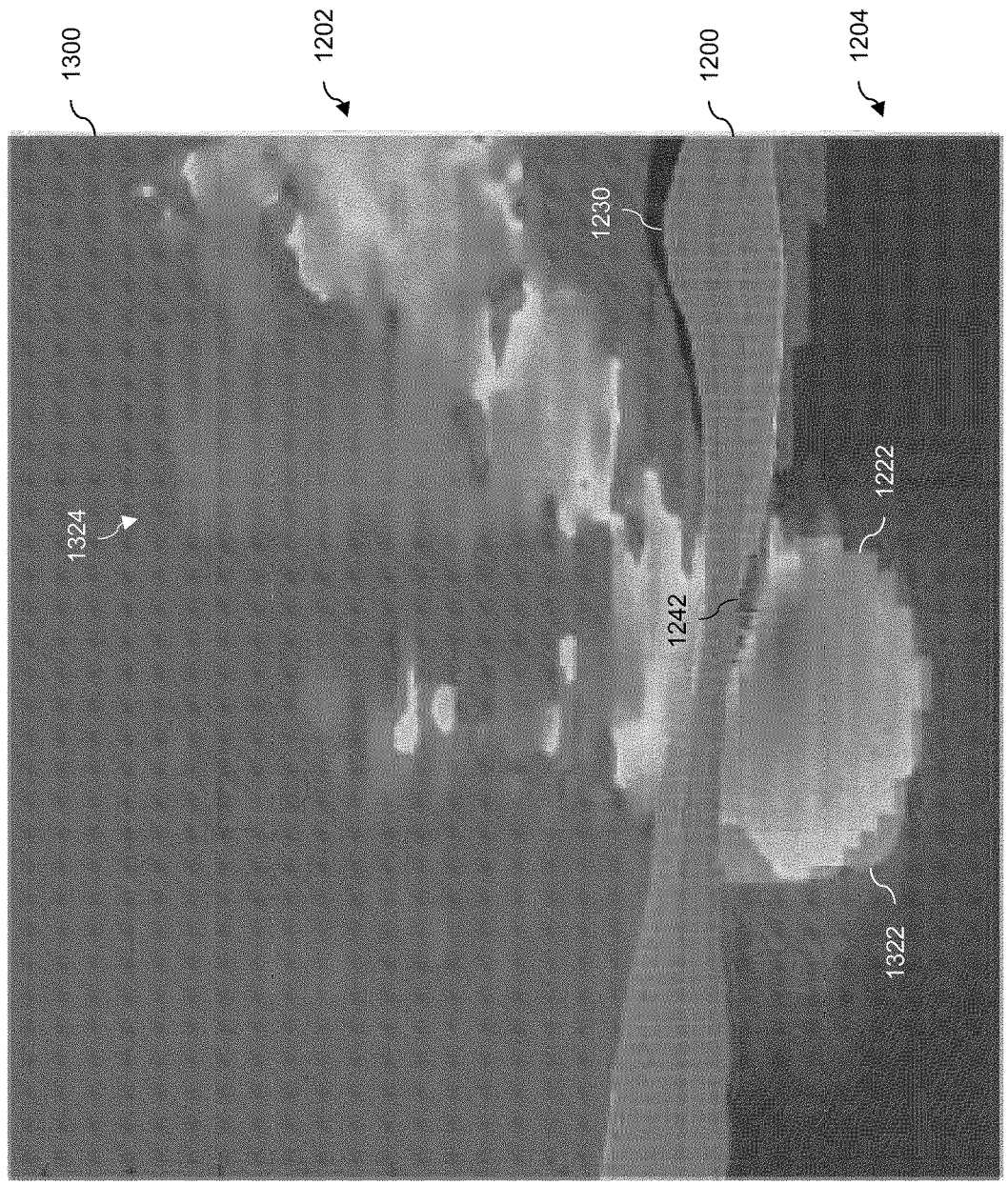
FIG. 13 is a diagrammatic view of a comparison of virtual three-dimensional Doppler volume data with acquired three-dimensional Doppler volume data, according to aspects of the present disclosure.

Referring again to FIG. 3, at step 335, the method 300 includes comparing blood flow based on the 3D model to acquired 3D Doppler volume data. Because the 3D Doppler volume data, or 3D color flow sequences were acquired during an imaging procedure, as in step 305, the morphologic detection of the orifice enables a model of the flow convergence shape to be generated so as to fit the 3D color flow data. Aspects of step 335 will be described with reference to FIGS. 13-15. FIG. 13 is a diagrammatic view of a comparison of virtual three-dimensional Doppler volume data 1222 with acquired three-dimensional Doppler volume data 1322, according to aspects of the present disclosure. FIG. 13 displays the same model 1200 with the virtual 3D Doppler volume 1222 overlaid on an ultrasound image 1300 with actual acquired three-dimensional Doppler volume data 1322. FIG. 13 additionally displays a jet 1324 corresponding to downstream blood flow shown in the image 1300. These 3D shapes (i.e. upstream convergent flow, downstream jets, and extended orifices) may be displayed in three dimensions to reveal the resemblance of the internal flow model with the acquired data and increase confidence in the proposed measurement.

The ultrasound image 1300 may be an ultrasound image acquired by the system 100 during an imaging procedure using 3D color Doppler techniques. As a result, varying colors representing different velocities can be seen in the upstream flow 1322 and in the jet 1324. By overlaying the model 1200 with the mitral valve 1230, orifice 1242, and virtual 3D color Doppler data over the image 1300, the accuracy of the model 1200 may be directly and quickly verified with the actual data. For example, the shape and orientation of the virtual upstream data 1222 may be visually compared with the actual upstream data 1322. The color within the virtual data 1222 and actual data 1322 may also be compared visually. In some embodiments, this comparison may be performed by a user. In other embodiments, the system 100 performs the comparison of virtual color Doppler data 1222 and actual color Doppler data 1322 using any of the image processing and/or machine learning techniques previously described.

The model 1200 may include any suitable features. For example, the model 1200 may include isovelocity surface meshes extrapolated from the model, velocity vector fields, streamlines, or any other features to show the adequacy of the proposed model with the actual mitral valve structure and the color flow. In particular, the superposition of the isovelocity surface from the model and from the 3D Color data provides a direct demonstration that the model built for the mitral regurgitation quantification matches the color data.

Figure 14:
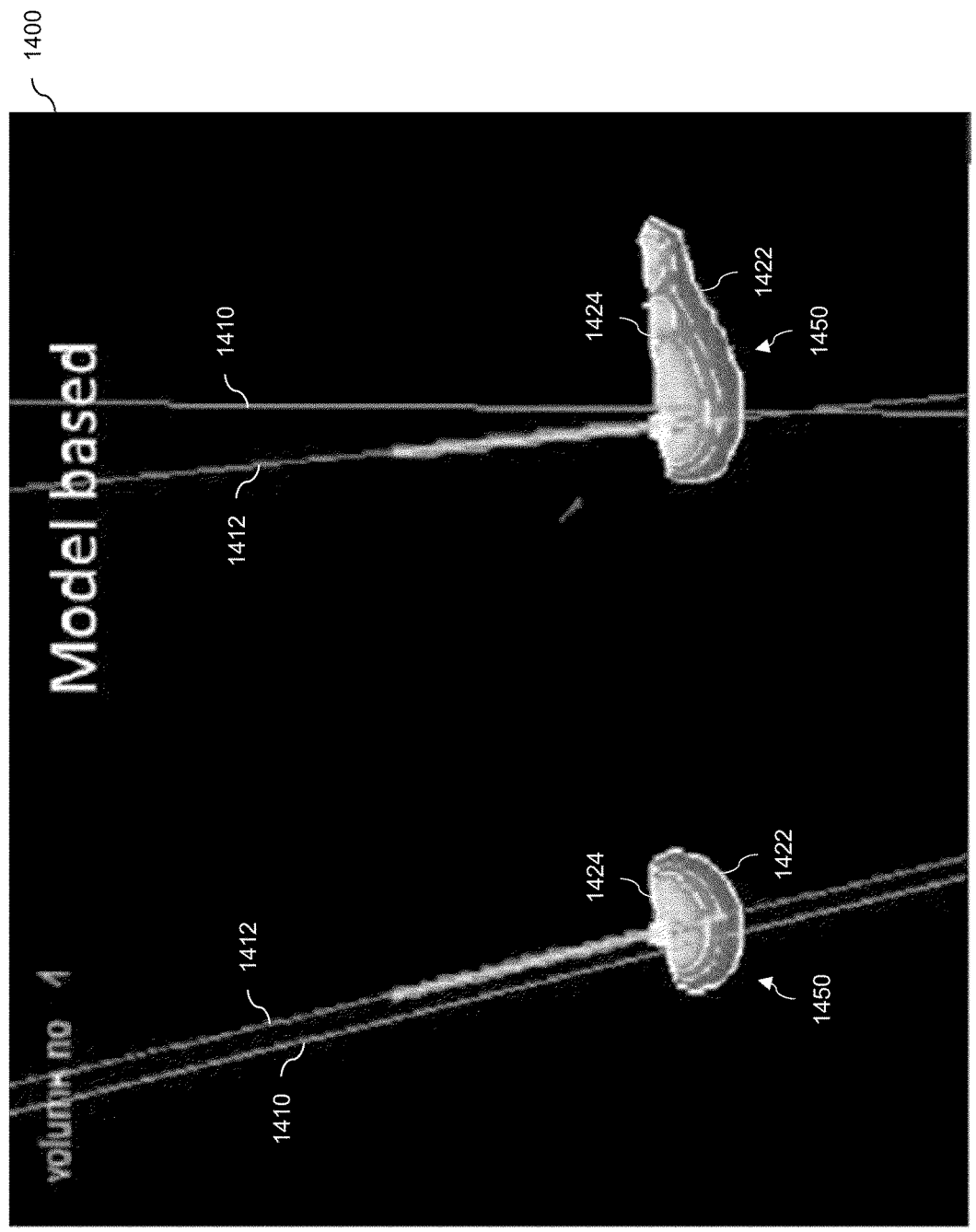
FIG. 14 is a diagrammatic view of virtual three-dimensional Doppler volume data corresponding to a model of a mitral valve, according to aspects of the present disclosure.

As shown in FIG. 13, an internal valve model, which shows the connection of the detected valve morphology with the related regurgitant flow, may verify the accuracy of the model. The system 100 may automatically extract features of the valve model (i.e. upstream convergent flow, downstream jets, orifices, and/or the surface of the mitral valve) resulting in a dynamic sequence of orifice detection and regurgitant flow displays. By automatically extracting these features, the system 100 may also provide more accurate and robust quantification of the regurgitation. This method may also be compatible with patient-side use because the model computations are fast enough for real-time use. FIG. 14 is a diagrammatic view of virtual three-dimensional Doppler volume data 1450 corresponding to a model of a mitral valve, according to aspects of the present disclosure. The virtual data 1450 shown may be two-dimensional or three-dimensional. The image 1400 shown in FIG. 14 may correspond to an alternative view of the virtual 3D color Doppler data generated by the system 100.

The virtual data 1450 shown in FIG. 14 includes several isovelocity curves 1422 and virtual color data 1424. The virtual color data 1424 may be generated based on the blood flow models previously described (e.g., the model of blood flow through the modelled orifice and mitral valve). This virtual color data 1424 may be generated in such a way as to resemble actual, obtained color data for optimal comparison, as will be described in more detail with reference to FIG. 15. In some embodiments, as shown in the image 1400, the virtual data 1450 may be displayed from two different orientations. Axes lines 1410 and 1412 may be displayed to denote orientation. For example, the view of the virtual data 1450 displayed on the left of the image 1400 may correspond to one cut plane view of the 3D color Doppler data 1450. The view on the right may show the same virtual data 1450 from a different cut plane view. For example, the view shown on the right of the image 1400 may be a view from an angle perpendicular to the view shown to the left of the image 1400. The images on the left and right are side views of the virtual three-dimensional Doppler volume data 1450. The images on the left and right, and/or the respective different cut planes or axes along which the images on the left and right are oriented, can be automatically determined based the valve model, the orifice model, and/or the flow model. The images and/or the respective different cut planes or axes can also be automatically determined based on MPR. For example, the MPR can be based on the acquired 3D Doppler ultrasound data or the generated flow model.

The images can be based on an initial shape and/or a modified shape of the orifice. In this example, the orifice may be a slit-like shape that is elongated in one direction as shown by the view of the data 1450 on the right of the image 1400 but is narrow in the other perpendicular direction as shown by the view of the data 1450 on the left. Thus, left image can be oriented along the short axis of the orifice, and the right image can be oriented along the long axis. This slit-shaped orifice may result in similarly shaped upstream flow and/or isovelocity curves as shown. In some embodiments, the axes 1410 and/or 1412 may correspond to a jet main axis, a valve normal axis, or a perpendicular axis. In the illustrated embodiment, the axis 1410 is the jet axis and the axis 1412 is the valve normal/perpendicular axis.

Figure 15:
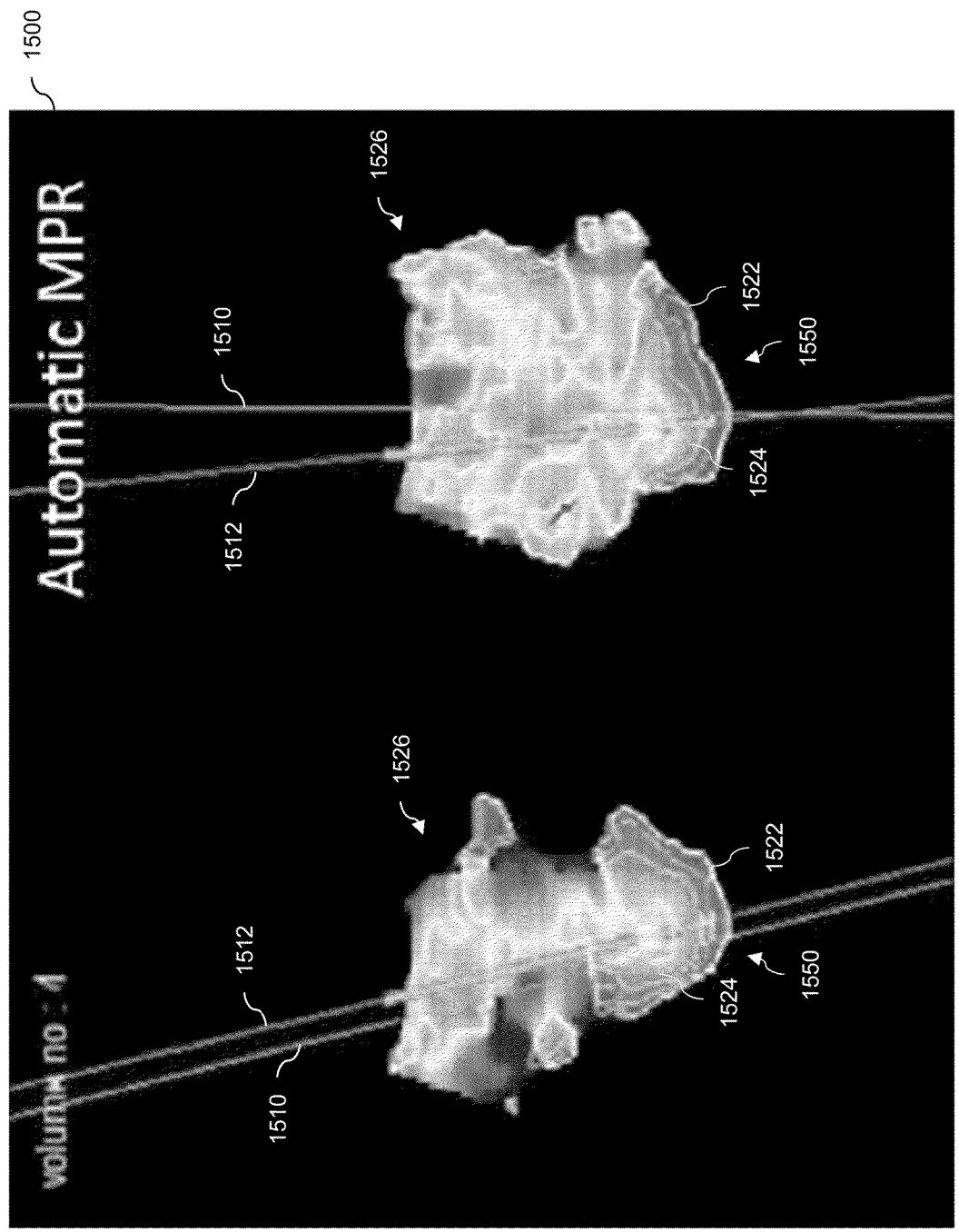
FIG. 15 is a diagrammatic view of a comparison of virtual three-dimensional Doppler volume data with acquired three-dimensional Doppler volume data, according to aspects of the present disclosure.

FIG. 15 is a diagrammatic view of acquired three-dimensional Doppler volume data 1550, according to aspects of the present disclosure. The acquired Doppler volume data 1550 may be ultrasound data acquired by imaging the same orifice which was modeled in generating the virtual data of FIG. 14. As a result, the acquired data 1550 may be used to validate the virtual data 1450.

FIG. 15 shows the 3D color Doppler volume data 1550 acquired during an imaging procedure. The data 1550 includes isovelocity curves 1522 and color data 1524. In an example in which the data 1550 is acquired data of the same orifice which was modeled to produce the virtual data 1450, the isovelocity curves 1522 may be compared to the isovelocity curves 1422. In that regard, the isovelocity curves 1522 are provided in FIG. 15 are generated based on the actual velocities determined based on the 3D color Doppler volume data. The isovelocity curves 1422 provided in FIG. 14 are computed based on the blood flow model. Depending on how closely aligned the curves 1522 are with the curves 1422, the user or the system 100 may determine the accuracy of the virtual data 1450. In addition, the acquired color data 1524 may be compared with the virtual color data 1424. Similarly, the system 100 or a user of the system may determine the accuracy of the virtual data 1450 based on the similarity of the color data 1524 and 1424.

For example, in one embodiment, the system 100 may compare individual pixels or other sections of the data 1450 with the data 1550. The velocity of the fluid may be known for each pixel or section of the data 1450 and 1550. The system 100 may determine the difference in velocity between the same pixels within the virtual data 1450 and the actual data 1550 and compare that difference to a threshold. If the difference in velocity is greater than the threshold, the system 100 may conclude that the virtual data 1450 is inaccurate and must be discarded or modified, as will be discussed in more detail hereafter. On the other hand, if the system 100 determines that the difference in velocities for a given pixel or section is less than the threshold, it may determine that the virtual data 1450 is accurate and correctly positioned and does not need to be discarded or adjusted.

Additionally shown in the image 1500 of FIG. 15 are the axes 1510 and 1512. The axes 1510 and 1512 may be substantially similar to the axes 1410 and 1412 of FIG. 14 in that they may denote the orientation of the two views of the data 1550 shown. For example, the view of the virtual data 1550 displayed on the left of the image 1500 may correspond to one cut plane view of the 3D color Doppler data 1550. The viewing angle of this view may be the same as the viewing angle of the view of the virtual data 1450 on the left of the image 1400 of FIG. 14. Referring to FIG. 15, the view on the right may show the same acquired data 1550 but from a different cut plane view. For example, the view shown on the right of the image 1500 may be a view from an angle perpendicular to the view shown to the left of the image 1500. The view on the right of the image 1500 may be the same viewing angle as the view on the right of the image 1400 of FIG. 14. The ultrasound images on the left and right are side views of the 3D color Doppler volume data 1550. The ultrasound images on the left and right, and/or the respective different cut planes or axes along which the ultrasound images on the left and right are oriented, can be automatically determined using MPR. The ultrasound images can be based on an initial shape and/or a modified shape of the orifice. For example, the ultrasound images can be oriented respectively along a short axis and a long axis of the orifice. This advantageously provides the user with a more complete and accurate representation of an orifice that has a more complex, non-circular, and/or irregular shape (e.g., a slit shape).

It is also noted that the image 1500 shown in FIG. 15 additionally includes 3D Doppler data corresponding to downstream blood flow 1526. This downstream data 1526 is not necessary to be modeled in the virtual data 1450, but may be. In some embodiments, the system 100 may determine the location of the mitral valve or orifice relative to the acquired Doppler data 1550 shown in FIG. 15. The system 100 may then compare only the upstream portion of the acquired Doppler data 1550 to the virtual data 1450.

Figure 16:
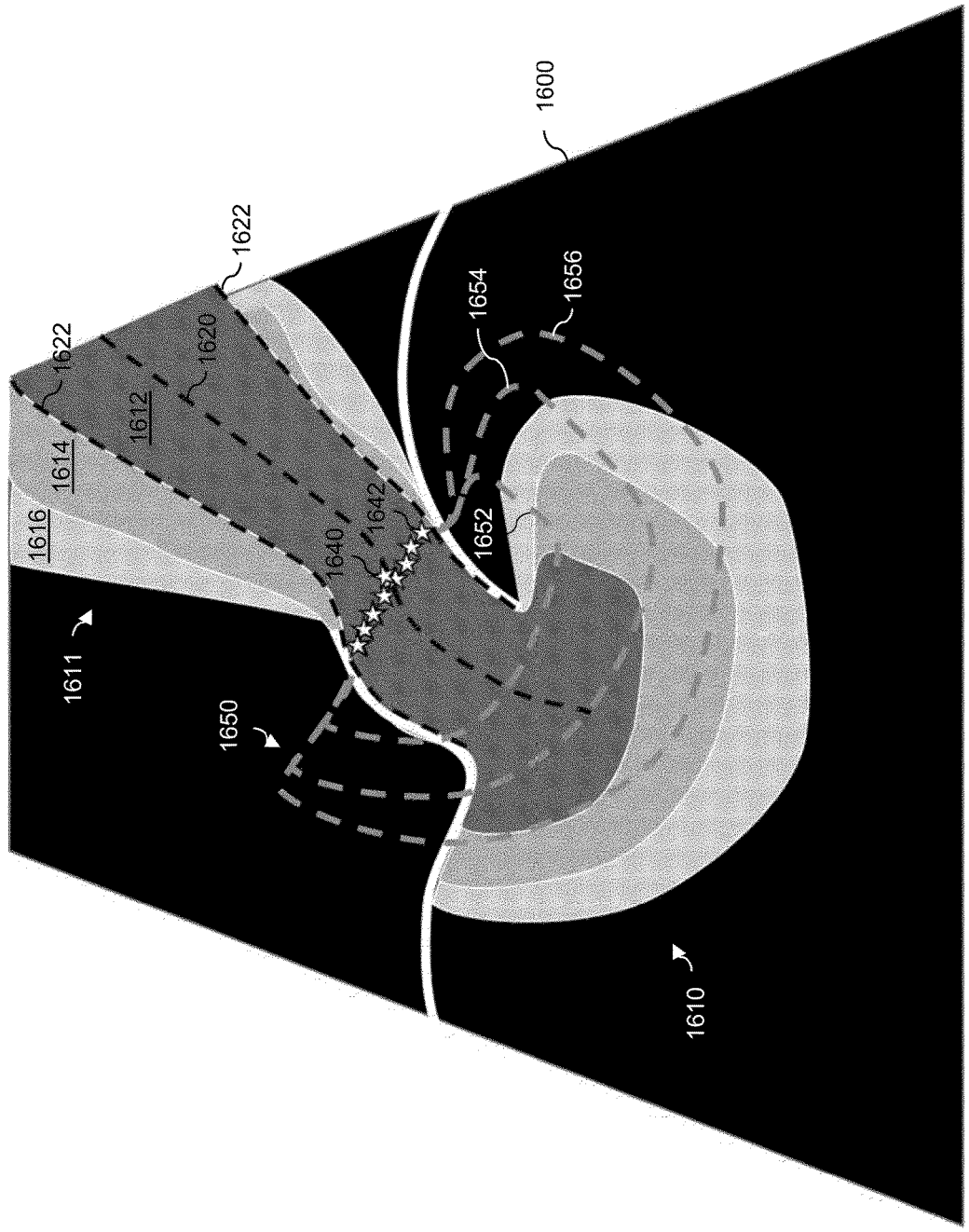
FIG. 16 is a diagrammatic view of a comparison of a model of blood flow data and acquired blood flow data before adjustments of the model are made, according to aspects of the present disclosure.

Referring back to FIG. 3, step 340 of the method 300 includes adjusting the 3D model of the mitral valve and/or the orifice to match the acquired 3D Doppler volume data. For example, the 3D model of the mitral valve and/or orifice is adjusted, which causes the blood flow model to also be adjusted. Because the blood flow model is a model of fluid dynamics passing through the structural models of the valve and orifice, the blood flow model may change in response to any changes in the mitral valve model or orifice model. At step 340, the mitral valve model and/or the orifice model may be adjusted until the resulting 3D blood flow model matches the acquired 3D Doppler data. The match or correlation can be determined based on a threshold in some embodiments. For example, the degree of match or correlation can be quantified by a confidence metric. The orifice model can be adjusted (and as a result, the 3D blood flow model can be adjusted) iteratively until the confidence metric satisfies (e.g., meets or exceeds the threshold. For example, the metric can be based on, e.g., a degree of numerical overlap between the velocities provided by the flow model and the 3D Doppler ultrasound data and/or a degree of spatial overlap of different velocity regions provided by the flow model and the 3D Doppler ultrasound data. Using the 3D characteristics of the modeled blood flow and actual acquired blood flow, the model of the blood flow through the orifice(s) of the mitral valve may be verified at each frame of the regurgitation sequence. Aspects of step 340 will be described with reference to FIGS. 16-18. FIG. 16 is a diagrammatic view of a comparison of a model of blood flow data 1650 and acquired blood flow data 1610 before adjustments of the model 1650 are made, according to aspects of the present disclosure. The model 1650 shown may be two-dimensional or three-dimensional. The acquired blood flow data 1610 shown in FIG. 16 includes regions of varying velocities as shown by different colors, and includes regions 1612, 1614, and 1616. A centerline 1620 and borderlines 1622 are also identified. The model 1650 includes a seed point 1640, a number of orifice locations points 1642, and three isovelocity curves including curve 1652, curve 1654, and curve 1656.

The model 1650 shown may be an additional view of, or may be based on, the models of surface area, velocity, and flow of isovelocity curves and blood flow of the modeled orifice and mitral valve. For example, the model 1650 may be based on any of the data or calculations described with reference to any of FIGS. 10-15. Once the model 1650 is generated, it may be adjusted and/or rescaled to be compatible with the acquired 3D color Doppler data 1610.

The system 100 may identify a centerline 1620 of the acquired Doppler data 1610. In some embodiments, the downstream jet portion 1611 of the acquired data 1610 may be used to determine the centerline 1620. For example, the acquired data 1610 may include the regions 1612, 1614, and 1616. These regions may correspond to regions of the same or similar velocity. For example, at all points in three-dimensional space along the borderlines 1622 of the region 1612, the blood may be moving at the same velocity. These borderlines 1622 may be used to determine the centerline 1620. In some embodiments, the system 100 may determine all positions equidistant from either borderline 1622 along the region 1612 of the downstream data 1611. These equidistant positions may define the centerline 1620.

The centerline 1620 may serve as an axis of orientation for the model 1650. The centerline 1620 may also be referred to as the jet main axis or the valve normal.

Based on the position of the centerline 1620, the system 100 may determine the location of the seed point 1640. The seed point 1640 may be the initial presumed location of the center of the orifice. The seed point 1640 may determine the initial positioning/orientation of the model 1650 overlaid over the acquired data 1610. The seed point 1640 may be positioned at some point along the centerline 1620. The system 100 may use any suitable method to determine the location of the seed point 1640 along the centerline 1620. In one embodiment, the system 100 may employ any of the previously mentioned image processing techniques previously described to determine the location of the orifice and position the seed point at that location along the centerline 1620.

Based on the location of the seed point 1640, the orifice points 1642 and associated isovelocity curves 1652, 1654, and 1656 may be positioned/oriented within the image 1600. In one embodiment, the orifice points 1642 may be or correspond to the source points used to calculate the isovelocity curves 1652, 1654, and 1656 using principles discussed with reference to FIG. 10. The orifice points 1642 may be initially placed at the same location along the centerline 1620 as the seed point 1640. In some embodiments, the size or scale of the model 1650 may be determined based on the borderlines 1622 of the jet. For example, the orifice points 1642 may be positioned so as to extend from one borderline 1622 to the other as shown in FIG. 16. The accompanying isovelocity curves may be scaled to match the resulting scale of the orifice points 1642.

The orientation of the model 1650 may be determined in any suitable manner. For example, the model 1650 may be oriented such that the line defined by the orifice points 1642 are perpendicular to the centerline 1620 and/or the borderline 1622. In other embodiments, the model 1650 may be oriented such that the orifice points 1642 are aligned so as to be substantially parallel to the surface of the mitral valve. Other factors may influence the initial positioning/orientation of the model 1650 as well including the size and orientation of acquired color doppler data, the downstream jet, or any other characteristics of the image 1600.

After the model 1650 is initially placed within the image 1600 according to the principles previously described, the system 100 may analyze the image 1600 to determine if the model is accurate and properly placed. The system 100 may use various image processing and machine learning techniques. such as those previously described, to identify relevant features within the acquired data 1610 and the model 1650 for comparison.

In one embodiment, the system 100 may determine the velocity of the fluid as measured by the 3D color Doppler data 1610. As shown in FIG. 16, the region 1616 may behave like an isovelocity curve of a uniform velocity in the region upstream of the mitral valve. Such an isovelocity curve may correspond to the outer edge of the region 1616 shown. Similarly, the region 1614 may correspond to an isovelocity curve of a uniform velocity in the upstream region. The region 1614 may represent a region of higher velocity than the region 1616. The outer edge of the region 1614 may correspond to an isovelocity curve. Similarly, the region 1612 may correspond to an isovelocity curve of a uniform velocity in the upstream region. The region 1612 may represent a region of higher velocity than both the region 1614 and the region 1616. The outer edge of the region 1612 may correspond to an isovelocity curve.

In some embodiments, the system 100 may generate the isovelocity curves 1652, 1654, and 1656 of the blood flow model 1650 based on the measured velocities of the regions 1612, 1614, and 1616. For example, the curve 1652 may be of the same velocity as the region 1612, the curve 1654 may be of the same velocity as the region 1614, and the curve 1656 may be of the same velocity as the region 1616. Based on this relationship, the system 100 may determine that the model 1650 needs to be moved such that the curves 1652, 1654, and 1656 align with the outer edges of the regions 1612, 1614, and 1616 respectively. The blood flow model 1650 may be adjusted by making adjustments to the model of the corresponding orifice. For example, as the orifice model within the mitral valve model is adjusted or repositioned/re-oriented, the blood flow model 1650 may similarly be adjusted or repositioned/re-oriented in response. Such an adjustment, repositioning/re-orientation, or alignment is shown in FIG. 17 described below.

The system 100 may adjust the position/orientation of the model 1650 by varying characteristics such as position, rotation, or shape of the orifice model in any suitable ways. For example, the system 100 may incrementally vary the position of orifice model, which may in turn vary the position of the blood flow model 1650. For example, the orifice location can be moved along the direction or axis normal or perpendicular to the valve. The orifice model position may be varied in depth, or its location upstream or downstream of the mitral valve, or adjust the position in any other direction such as laterally along the plane of the mitral valve. In addition, the system 100 may incrementally vary the rotation/orientation of the model 1650. In some embodiments, the system 100 may vary the definition or shape of the modelled orifice by adjusting a velocity threshold, as will be described in more detail with reference to FIG. 18.

Figure 17:
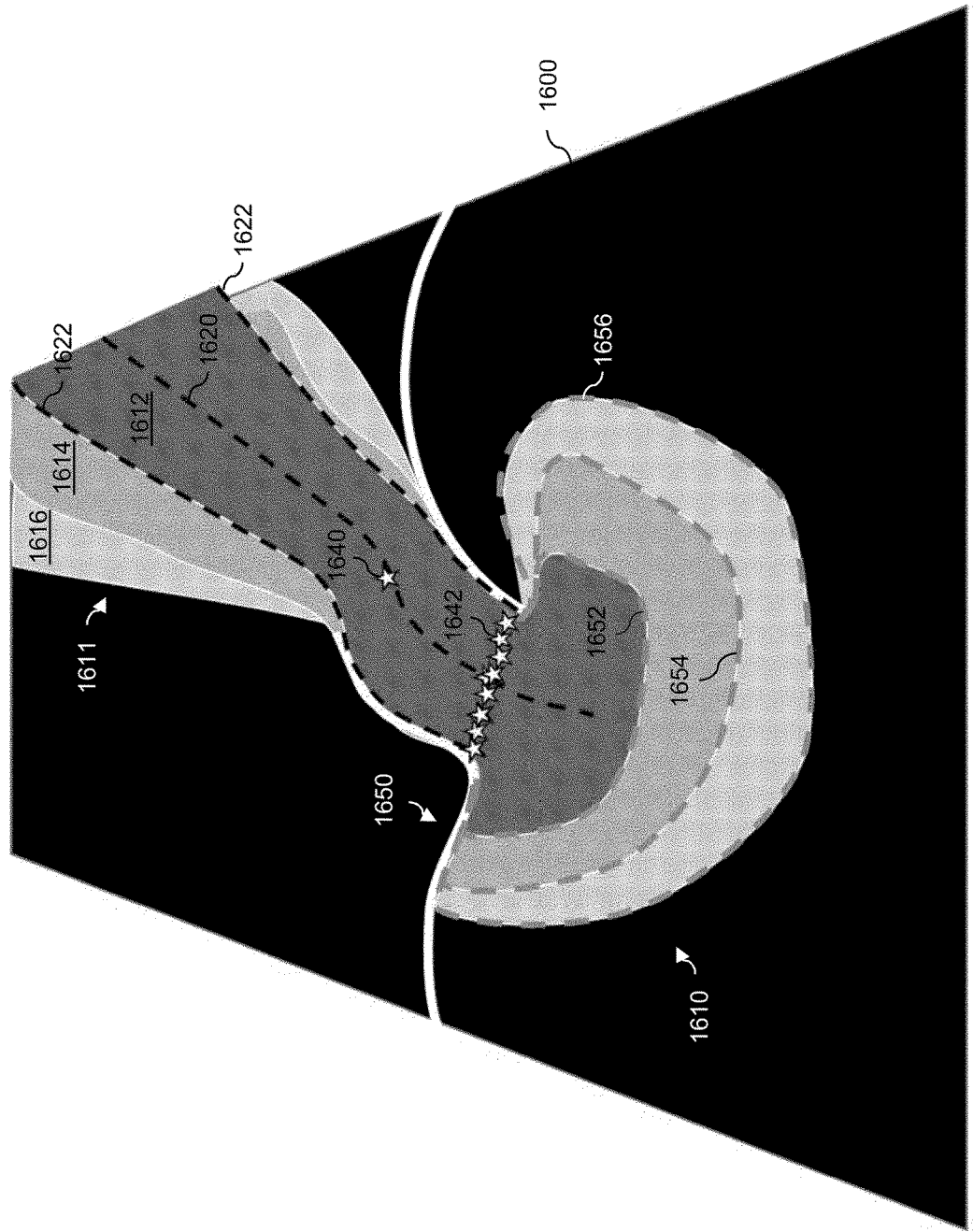
FIG. 17 is a diagrammatic view of a comparison of a model of blood flow data and acquired blood flow data after adjustments of the model are made, according to aspects of the present disclosure.

FIG. 17 is a diagrammatic view of a comparison of a model of blood flow data 1650 and acquired blood flow data 1610 after adjustments of the model 1650 are made, according to aspects of the present disclosure. As described with reference to FIG. 17, the isovelocity curves of the model 1650 may be aligned with the outer edges of the regions 1612, 1614, and 1616 of the acquired data 1610. As the orifice points 1642 are adjusted, the blood flow model including the isovelocity curves shown are also adjusted as shown. In some embodiments, the orifice points 1642 may still be constrained to be positioned along the centerline 1620 and extending from the borderlines 1622 of the jet region 1612 as shown in FIG. 17 and as described with reference to FIG. 16. In other embodiments, this constraint may not be imposed. As described with reference to FIG. 16 and FIG. 17, the processor circuit 210 may adjust or change the model of the orifice such that the blood flow model is also changed to match the acquired Doppler data.

After the model 1650 is repositioned/re-oriented within the image 1600, the system 100 may again verify that the model 1650 is correctly positioned/oriented and accurately reflects the actual acquired data 1610. As previously described, this may be done in any number of ways. In some embodiments, the system 100 may conduct a pixel-by-pixel or section-by-section comparison of the modeled data 1650 with the acquired data 1610. If each pixel or section compared satisfies a predetermined threshold of difference in velocity, flow, or position, the system 100 may determine that the model 1650 is correctly placed and accurately reflects the flow through the imaged orifice.

Figure 18:
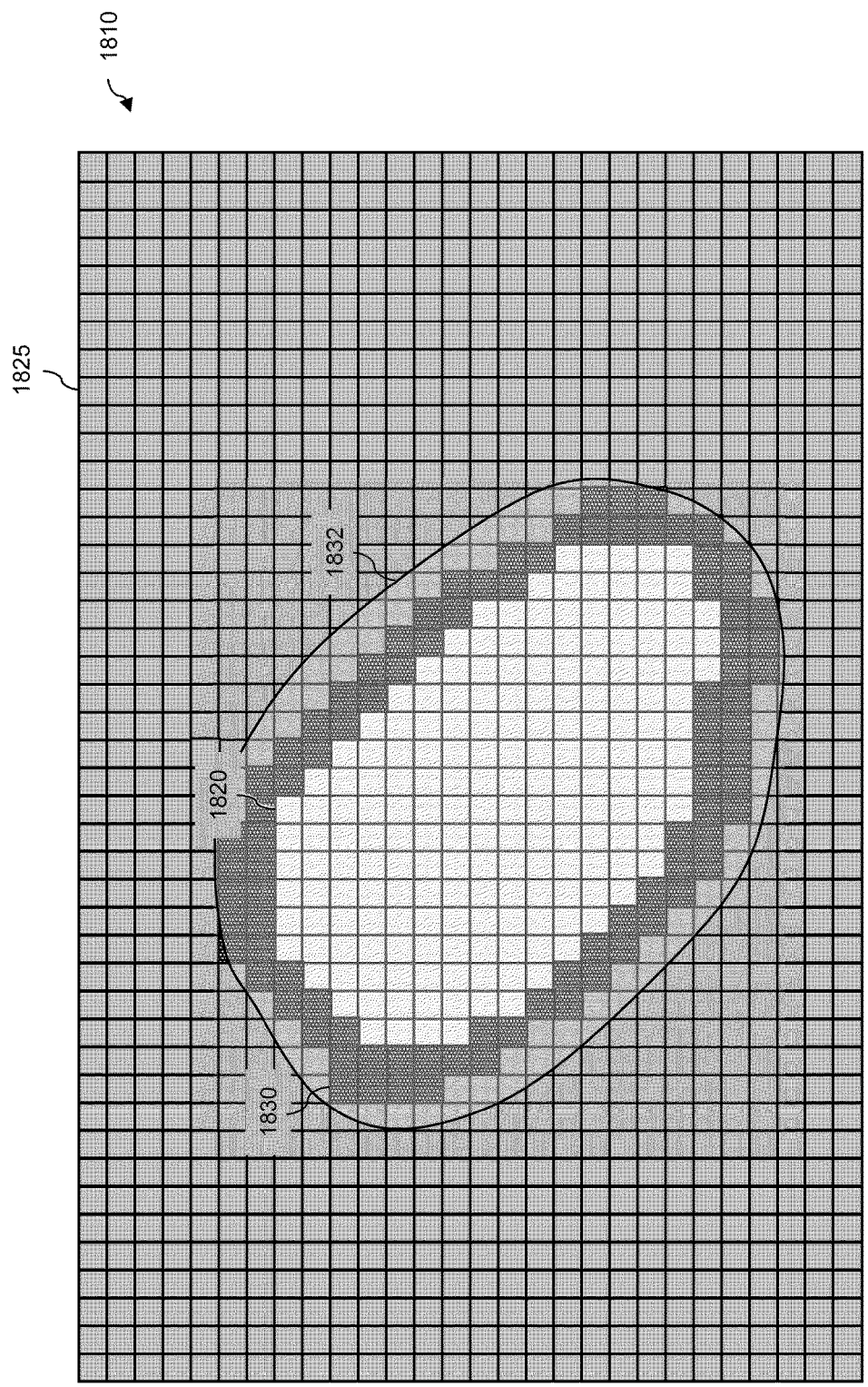
FIG. 18 is a diagrammatic view of a model of an orifice of a mitral valve after adjustments of a velocity threshold are made, according to aspects of the present disclosure.

FIG. 18 is a diagrammatic view of a model 1810 of an orifice of a mitral valve after adjustments of a velocity threshold are made, according to aspects of the present disclosure. The model 1810 shown may be two-dimensional or three-dimensional. Referring to FIG. 16, in some applications, adjustments to the model 1650 are not only positional/orientation-al, but the shape of the orifice of the model may need to be changed to accurately reflect the flow.

One method of redefining the shape of the orifice is by varying the velocity threshold for each point of the model of the mitral valve or orifice. As previously described with reference to FIG. 7, the system 100 may define an orifice by partitioning the plane of the mitral valve into multiple sections. The velocity as shown by the 3D color Doppler data for each section may determine whether the system 100 will classify the section as corresponding to the mitral valve or the orifice. For example, if a particular section exhibits a velocity higher than the threshold, the system 100 may determine that blood is flowing through that section and classify the section as a section of the orifice. Alternatively, if, based on the 3D color Doppler data, a particular section shows no velocity, or a velocity less than the predetermined threshold, the system 100 may classify that section as corresponding to a section of the mitral valve through which blood does not flow.

Referring again to FIG. 18, a model 1810 of a mitral valve and orifice is shown. The mitral valve model is constructed of many sections or points. These sections or points are illustrated by the blocks 1825 in the model 1810 shown. Similarly, the orifice within the model 1810 is constructed of many sections or point, illustrated by the blocks 1820. If, based on the comparisons of the modeled flow data to the measured flow data as described previously, the system 100 determines that the actual orifice is smaller than the modeled orifice, the system 100 may incrementally increase the threshold velocity. As the threshold velocity is increased, fewer blocks of the model 1810 meet or exceed the threshold and are no longer included in the orifice model. These blocks which are initially included in the orifice model but are converted from orifice blocks 1820 to mitral valve blocks 1825 are illustrated by the blocks 1830. Velocity thresholding can thus be used to change the shape of the orifice (e.g., the orifice definition within the valve model).

As the threshold velocity is incrementally increased, the system 100 may again compare the resulting flow of the model 1650 with the actual flow data 1610 to determine whether the threshold velocity produces an accurate model. As shown in FIG. 18, an isovelocity curve 1832 corresponding to the newly updated model based on a higher velocity threshold may be generated. The isovelocity curve 1832 may represent the points in three-dimensional space around the newly modeled orifice shown at which the fluid moving towards the orifice moves at the same velocity. The isovelocity curve 1832 may be one of several components of the flow model corresponding to the newly modeled orifice.

In some embodiments, the processor circuit can output a graphical representation of the changed orifice model 1820, with the different shape, different position, and/or different orientation. For example, display of the orifice model 1820 can be provided within the valve model 1810 (e.g., as a graphical overlay). In some embodiments, the graphical representation of the changed orifice model 1820 and/or the valve model 1810 (e.g., as a graphical overlay) can be displayed on an ultrasound image generated using the Doppler and/or B-model ultrasound data. In some embodiments, the processor circuit outputs the changed orifice model 1820 that results in a regurgitant flow model matching the 3D Doppler ultrasound data. The displayed changed orifice model can be referenced as the regurgitant orifice in some embodiments. A final orifice model or an interim orifice model between the initial and final versions can be displayed. In some embodiments, the processor circuit can output one or a plurality of iterations of the changed orifice model 1820.

Referring again to FIG. 3, at step 345, the method 300 includes computing flow volume and orifice area based on the adjusted 3D model. The adjusted 3D model may include the blood flow model, the model of the orifice, and/or the model of the mitral valve. Because the blood flow model has been adjusted at step 340 to match the acquired 3D Doppler data, measurements based on the blood flow model and/or the orifice model are accurate. At step 350, the processor circuit 210 (FIG. 2) may compute a blood flow volume measurement through the orifice for any of the acquired ultrasound images. The processor circuit may also compute an orifice area measurement for any of the acquired ultrasound image. As described with reference to FIG. 10, the total volume flow through the orifice may be calculated as a convolution of the flow through the many point sources which make up the orifice. This flow may be calculated as a unit of volume per a unit of time, such as milliliters per second, or any other suitable units. It is noted that this flow calculation corresponds specifically to the image frame being analyzed. For example, if n=0, referring to step 315, this flow calculation would correspond to the first ultrasound image frame 514 (FIG. 5) of the systolic cycle.

In addition to the flow volume metric, the system 100 may also calculate the area of the orifice for the ultrasound image frame selected. This metric may be directly related to the number of orifice blocks 1820 (FIG. 18) after all necessary adjustments are made to the model, or may be done another way. For example, the system 100 may use any of the mentioned image processing or machine learning techniques to identify the orifice and determine a radius, diameter, or other measurement of the orifice to determine the area of the orifice.

After the flow volume and orifice area are calculated for the identified ultrasound image, these metrics may be stored in a memory, such as the memory 138 (FIG. 1) or the memory 264 (FIG. 2). These metrics may be associated with the ultrasound image analyzed and the particular patient's file. At step 350, the method 300 includes determining whether additional ultrasound image frames have yet to be analyzed within the set of frames 510 corresponding to the systolic phase as identified by the indicator 530 in FIG. 5. For example, after the first ultrasound image frame 514, n=0 (as in step 315), is analyzed by the system 100 according to steps 320 through 345, at step 350, the system 100 may determine that more ultrasound image frames from the systolic phase have not been analyzed, and the system 100 would proceed to step 355.

At step 355, the method 300 includes incrementing the n integer by one. For example, after the first image frame 514 (FIG. 5) is analyzed with steps 320 through 345, at step 355, the integer n may progress to n=1. This incrementation of the integer n may signal to the system 100 to select the next ultrasound image frame acquired directly after the frame 514 and to analyze this next frame according to steps 320 through 345 of the method 300. After this is completed, at step 355, the integer n may be increased by one again (i.e. n=2), and the next acquired image may be analyzed. This process may be continued until the final ultrasound image of the systolic phase has been analyzed according to steps 320 through 345. By completing steps 320 through 345 for each ultrasound image corresponding to a systolic phase, the volume flow and orifice area may be accurately determined despite the dynamic, moving mitral valve surface which may continuously move throughout systole. This may account for the temporal variation of the hemodynamics of the blood flow during mitral regurgitation, leading to a more accurate measurement. After the final ultrasound image of the systolic phase is analyzed, the system 100 may progress from step 350 to step 360.

Figure 19:
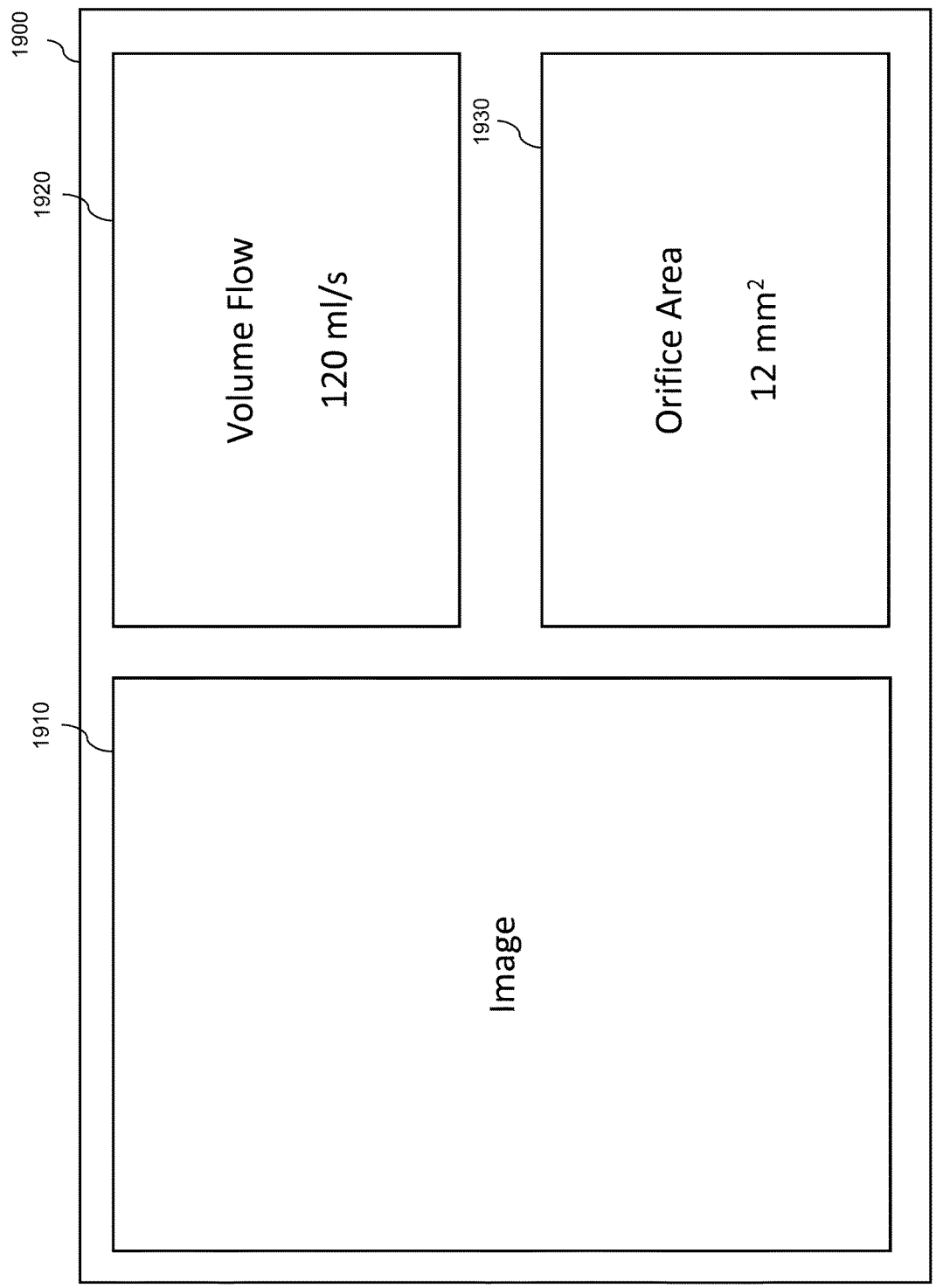
FIG. 19 is a diagrammatic view of a graphical user interface displaying an image and associated metrics, according to aspects of the present disclosure.

At step 360, the method 300 includes outputting a screen display. Step 360 will be described with reference to FIGS. 19-22. FIG. 19 is a diagrammatic view of a graphical user interface 1900 displaying an image 1910 and associated metrics, according to aspects of the present disclosure. After the system 100 has acquired 3D color Doppler data of the mitral valve and generated, compared, and adjusted a virtual model of the data for each ultrasound image frame in the systolic phase, the system 100 may display the results to the user. It is noted, that the system 100 may additionally display various displays to the user throughout any of the enumerated steps of the method 300 including any of the depictions of the figures shown and described herein or other depictions. The graphical user interface 1900 displaying resulting data to the user may include any suitable features or elements including or in addition to those shown and described in FIG. 19. The graphical user interface 1900 may be displayed to a user during an ultrasound imaging procedure in a point of care setting or may be displayed at some point thereafter. From a high level, the display may include a representation of the flow model upstream from the orifice overlaid on the original color doppler data and include a quantification of the flow and orifice area during systole. The screen display displayed by the processor circuit 210 (FIG. 2) shown in FIG. 19 may include a depiction of the ultrasound data, such as the ultrasound data received at step 305 of the method 300 (FIG. 3), a model of the mitral valve, such as the model described with reference to FIG. 6, a model of the orifice(s), such as the model described with reference to FIG. 7 and/or FIG. 10, 12, 13, 17, or 17, a model of the blood flow through the orifice(s), such as the model described with reference to FIG. 10, a blood flow volume, such as the volume computed at step 345 of the method 300 (FIG. 3), the orifice area, such as the area computed at step 345 of the method 300 (FIG. 3), or the a metric of total blood volume which passed though the orifice(s) of the mitral valve throughout systole, as will be described with more detail with reference to FIG. 22.

In one example, however, FIG. 19 may include an image 1910, a metric 1920, and a metric 1930. The image 1910 may be any suitable image relating to the imaging procedure of the mitral valve or any other relevant depiction. In one embodiment, the image 1910 may be a color Doppler ultrasound image showing a mitral valve allowing regurgitant flow during a systolic phase, such as the image 400 of FIG. 4. The image 1910 may also be a color Doppler ultrasound image from a diastolic phase of the cardiac cycle. In some embodiments, the image 1910 may be a B-mode ultrasound image. In some embodiments, the image 1910 may depict the generated model of the mitral valve, such as the one shown in the image 600 of FIG. 6, the model 1010 of FIG. 10, the image 1100 of FIG. 11, the image 1200 of FIG. 12, the image 1400 of FIG. 14, or the model 1810 of FIG. 18. In some embodiments, the image 1900 may be depict a comparison of virtual flow data or a corresponding model and acquired color Doppler data such as the depictions in FIG. 13. FIG. 16, or FIG. 17. The image 1900 may also be similar to the image 1500 of FIG. 15. In addition, in some embodiments, the image 1900 may be similar to the image 2000 of FIG. 20, 2100 of FIG. 21, or the plot 2200 of FIG. 22, each of which will be described hereafter. The image 1900 may include any one, some, or all of these example images together in a single image. The image 1900 may include any appropriate annotations such as drawings, indicators, symbols, or alphanumeric text within the image. Such annotations may be created in response to a user input or created automatically. These annotations may be overlaid over the image 1900 or may be positioned adjacent to the image 1900.

The image 1910 may be static or dynamic. For example, the image 1910 may be any of the images listed above or may be a dynamic image showing several ultrasound image frames in sequence. The image 1910 may be a dynamic model showing the mitral valve, orifice, blood flow and any visual indicators of the flow such as isovelocity curves, vectors, or other indicators over time or throughout the systolic phase. In some embodiments, the image 1910 may be a real-time dynamic image showing the patient anatomy. This real-time dynamic image may also display various aspects of the blood flow model or valve or orifice model overlaid over the ultrasound image frames as well. In some embodiments, such a dynamic image frame sequence may be viewed shortly after the ultrasound images are acquired or after the imaging procedure.

The graphical user interface 1900 may additionally include various metrics, including the metrics 1920 and 1930. The metrics 1920 and 1930 may correspond to any suitable measurements or calculations. As an example, the metric 1920 may correspond to a volume flow metric through an orifice of a mitral valve. As previously described, it may be in the form of a unit of volume per a unit of time. such as ml/s or any other suitable units. The volume flow may convey to the user the calculated volume flow through the orifice in a particular image frame shown in image 1910. The volume flow may additionally display flow at other times during the systolic phase. In some embodiments, the metric 1920 may correspond to a total volume of blood which passed through the orifice of the mitral valve throughout a systolic phase.

In some embodiments, the metric 1930 may correspond to the orifice area at a particular time. For example, the metric 1930 may convey to the user the orifice area of an orifice of a particular ultrasound image displayed as part of the image 1910. In other embodiments, the metric 1930 may be or include other measurements relating to the orifice, such as a radius or diameter of the orifice, a length of time or number ultrasound image frames throughout which the orifice remains open, the number of orifices identified in a particular ultrasound image frame, or any other suitable metrics.

In some embodiments, the graphical user interface 1900 may include displays of the regurgitation flow distribution superimposed on 2D or 3D displays of the acquired ultrasound data, using isovalue meshes or contours. The display may include the vector flow field in 2D or 3D shown as streamlines or vectors. The display may also include multi planar reformat viewing planes (MPRs). MPRs may be defined to provide the best cut plane view through the 3D ultrasound gray value and flow data. These orientations may be defined using the principle directions of the orifice, or the main axes of the orifice shape such as the jet main axis or valve normal. Any of these displays or images described previously may be shown as a cut plane or rendered in three-dimensions. In some embodiments, orifice contours may also be delineated on the estimated valve surface.

Figure 20:
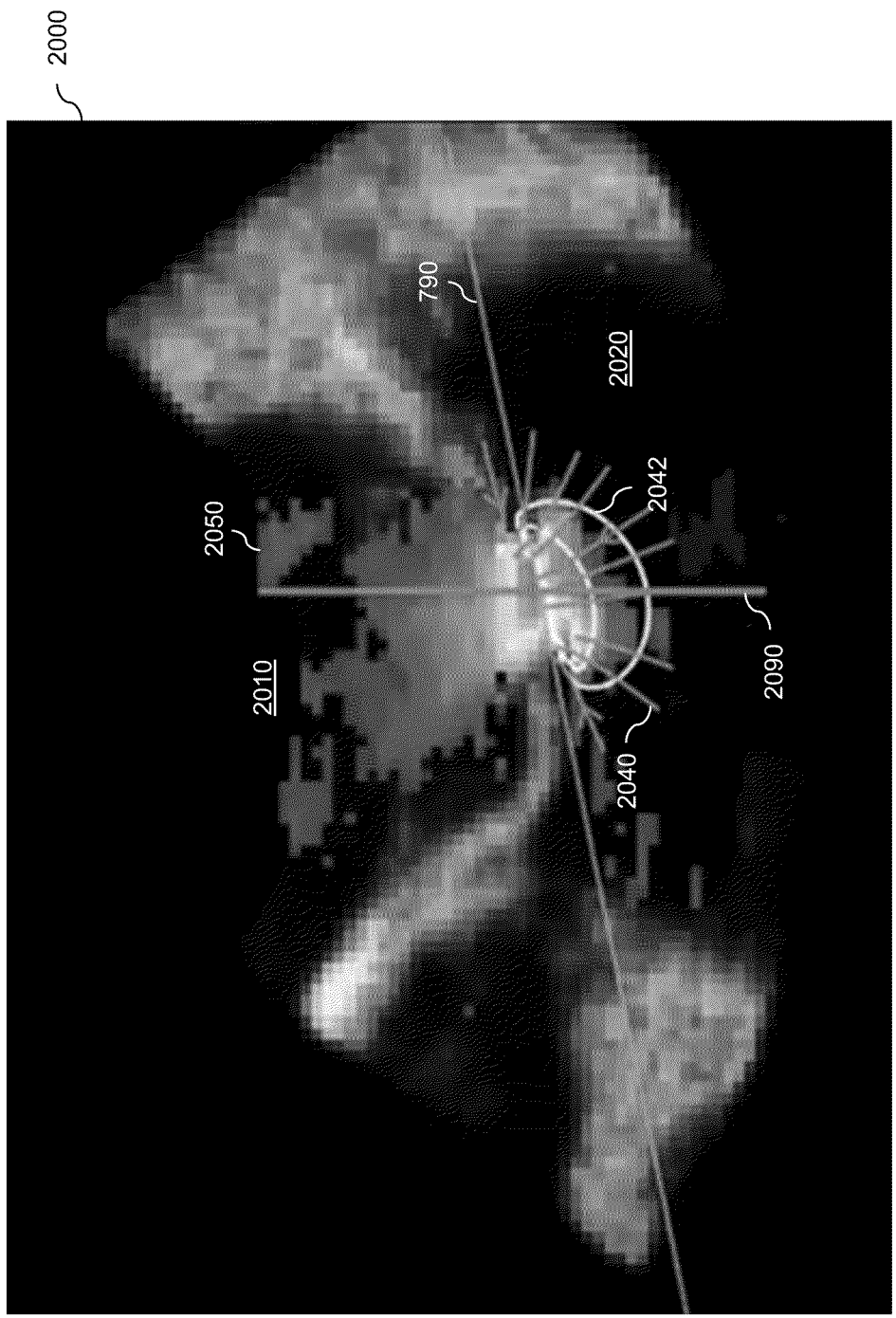
FIG. 20 is a diagrammatic view of modeled and adjusted blood flow data overlaid over a cross-section of a three-dimensional color Doppler ultrasound image, according to aspects of the present disclosure.

FIG. 20 is a diagrammatic view of modeled and adjusted blood flow data overlaid over a cross-section of a three-dimensional color Doppler ultrasound image 2000, according to aspects of the present disclosure. The image 2000 may be included in a graphical user interface, such as the graphical user interface 1900 as just described. For example, the image 2000 may be the image 1910 within the interface 1900. The image 2000 may also be displayed to a user of the system 100 another way. The image 2000 includes acquired 3D color Doppler data 2050, as well as virtual flow data including several isovelocity curves 2042 and flow vectors 2040. This virtual blood flow data may include two-dimensional and/or three-dimensional data.

As shown by the line 790, the image 2000 may be a cut plane of the same three-dimensional data used to generate the image 700 of FIG. 7. Specifically, referring again to FIG. 7, the line 790 is seen extending through a center point of the orifice 742. As the image 700 is an image showing a plane substantially parallel to the mitral valve such that the openings of the orifice 742 are seen, the cut plane shown by the line 790 may show a perpendicular view such that the mitral valve is viewed from the side separating the left ventricle 2020 and the left atrium 2010.

The color Doppler data 2050 shown in FIG. 20 shows the movement of blood from the ventricle 2020 to the atrium 2010 as observed by the ultrasound system 100. The modeled virtual blood flow data, including the curves 2042 and the vectors 2040, is shown to be aligned with the color Doppler data 2050. In that regard, the computed or calculated curves 2042 and vectors 2040 (from the flow model) are overlaid on the ultrasound image 2000 with the acquired color Doppler data 2050. For example, the outermost isovelocity curve 2042 closely aligns with the outer edge of the upstream color Doppler data 2050 within the ventricle 2020. Similarly, an additional isovelocity curve is seen to align with the edge of a change of colors, denoting an increased velocity, within the color Doppler data 2050 closer to the orifice of the mitral valve.

In addition to the curves 2042, the virtual blood flow model data may include vectors 2040. The vectors 2040 shown in FIG. 20 may be positioned perpendicular to the isovelocity curves. The vectors 2040 may denote by their direction the direction of movement of the blood. In addition, in some embodiments, the relative velocity of blood at various locations within the ventricle may be shown by the length of the vectors 2040.

The image 2000 shown in FIG. 20 may advantageously display to the user the location and extent of mitral regurgitation within a patient's heart. In addition, when coupled with the increased accuracy of flow and area measurements provided, the present disclosure provides substantially enhanced diagnostic tools for physicians to accurately know the extent of a heart condition, such as mitral regurgitation.

FIG. 20 also depicts an axis 2090 extending through the orifice. Generally, axis 2090 may identify a jet main axis of the blood flow, a valve normal axis, or a perpendicular axis. In some embodiments, the axis 2090 may identify a center point of an orifice or any other features of the mitral valve, orifice, or blood flow. In the illustrated embodiment, the axis 2090 is the jet axis.

Figure 21:
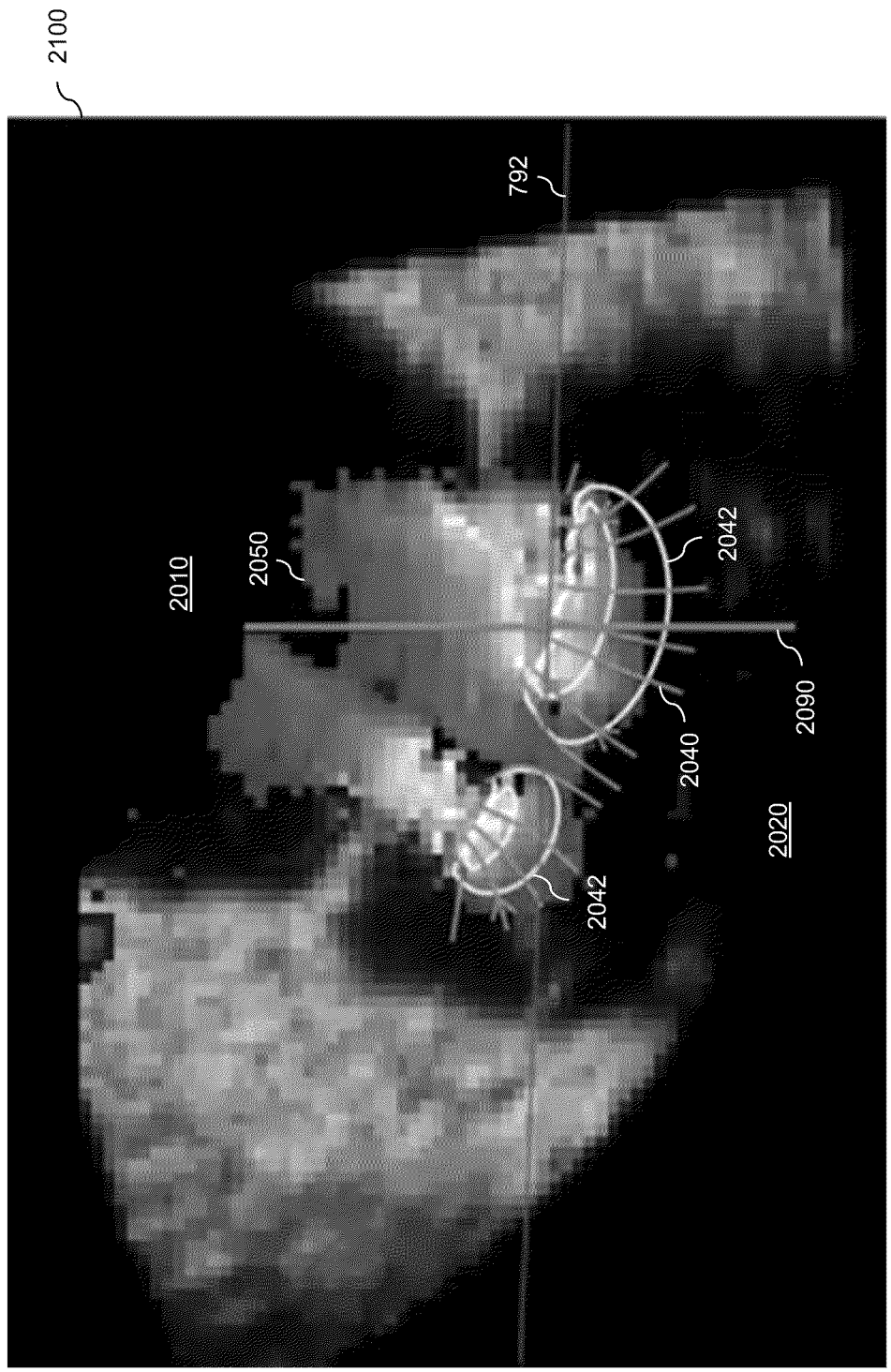
FIG. 21 is a diagrammatic view of modeled and adjusted blood flow data overlaid over a cross-section of a three-dimensional color Doppler ultrasound image, according to aspects of the present disclosure.

FIG. 21 is a diagrammatic view of modeled and adjusted blood flow data overlaid over a cross-section of a three-dimensional color Doppler ultrasound image, according to aspects of the present disclosure. Like the image 2000 of FIG. 20, the image 2100 may be included in a graphical user interface. such as the graphical user interface 1900 as described. For example, the image 2100 may be the image 1910 within the interface 1900. The image 2100 may also be displayed to a user of the system 100 another way. The image 2100 includes the acquired 3D color Doppler data 2050 shown in FIG. 20, as well as virtual flow data including the isovelocity curves 2042 and flow vectors 2040. However, as shown by the line 792, the image 2100 may be a cut plane of the same three-dimensional data but of a different angle. For example, like the image 2000, the image 2100 may be generated from the same data used to generate the image 700 of FIG. 7. Referring again to FIG. 7, the line 792 is seen extending through a center point of the orifice 742. As the image 700 is an image showing a plane substantially parallel to the mitral valve such that the openings of the orifice 742 are seen, the cut plane shown by the line 792 may show a perpendicular view such that the mitral valve is viewed from the side separating the left ventricle 2020 and the left atrium 2010. As shown in FIG. 7, the cut plane shown by the line 790 of FIG. 20 may be substantially perpendicular to the cut plane shown by the line 792 of FIG. 21.

Like in FIG. 20, the color Doppler data 2050 shown in FIG. 21 shows the movement of blood from the ventricle 2020 to the atrium 2010. The modeled virtual blood flow data, including the curves 2042 and the vectors 2040, is shown to be aligned with the color Doppler data 2050 with the outermost isovelocity curves 2042 closely aligning with the outer edges of the upstream color Doppler data 2050 within the ventricle 2020. In this example, because two orifices are shown from the angle shown by the cut plane of 792, two sets of isovelocity curves may be displayed.

The vectors 2040 shown in FIG. 21 are again positioned perpendicular to the isovelocity curves. The vectors 2040 may denote by their direction the direction of movement of the blood. In addition, in some embodiments, the relative velocity of blood at various locations within the ventricle may be shown by the length of the vectors 2040.

Figure 22:
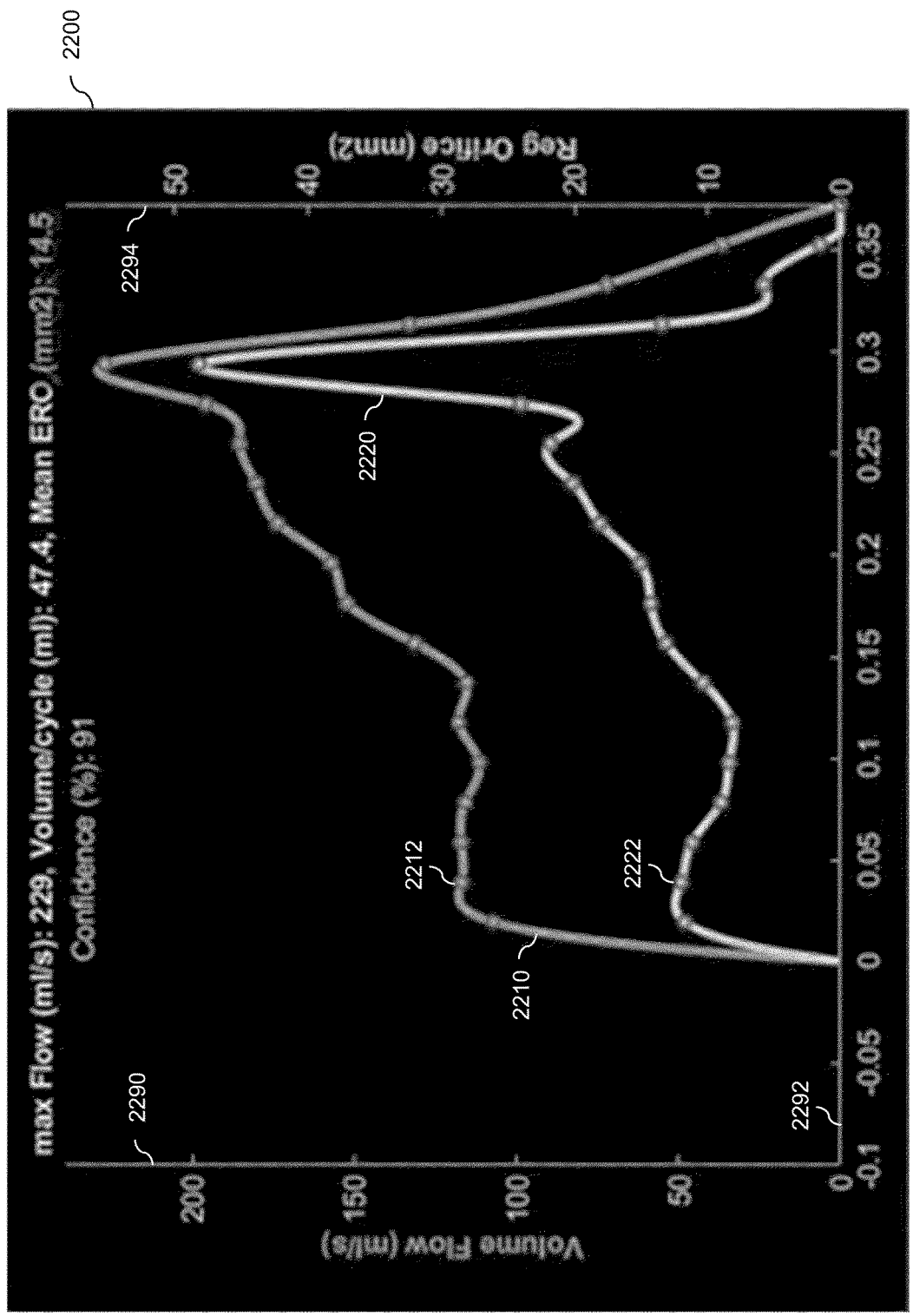
FIG. 22 is a diagrammatic view of a plot displaying regurgitant volume flow and orifice area measurements throughout a systolic phase of a cardiac cycle, according to aspects of the present disclosure.

FIG. 22 is a diagrammatic view of a plot 2200 displaying regurgitant volume flow 2210 and orifice area 2220 measurements throughout a systolic phase of a cardiac cycle, according to aspects of the present disclosure. The plot 2200 may provide the user of the system 100 with a graphical representation of both the regurgitant volume flow and orifice area of an orifice of a mitral valve throughout a systolic phase.

The plot 2200 includes a horizontal axis 2292 and two vertical axes: axis 2290 and axis 2294. The horizontal axis 2292 may correspond to a measurement of time. For example. The horizontal axis 2292 may illustrate time in units of seconds. Any unit of time may be employed in the illustration of the horizontal axis 2292. Alternatively, the horizontal axis 2292 may refer to image frames. For example, the left-most part of the horizontal axis 2292 may correspond to the first acquired image frame of systole (i.e. frame 514 of FIG. 5). Accordingly, the right-most part of the horizontal axis 2292 may correspond to the final acquired image frame of systole.

The vertical axis 2290 may correspond to a volume flow. As previously described, this volume flow may be expressed in terms of a unit volume per unit time, such as ml/s as shown, but may be any suitable units.

The vertical axis 2294 may correspond to an orifice area. As shown, the units of measurement for the orifice area may be millimeters squared. However, any other suitable units of area may be used to measure the orifice area.

Two curves, curve 2210 and curve 2220, corresponding to the volume flow over time and orifice area over time respectively, are additionally shown within the plot 2200. Each of these curves may be created based on the measured volume flow and orifice area of each ultrasound image acquired and analyzed at steps 320 through 345 of the method 300. Each of these values may be retrieved from the memory to generate the curve 2210 and the curve 2220.

Several points 2212 are shown placed along the curve 2210. These points may correspond to ultrasound image frames. For example, the point 2212 identified in the plot 2200 may correspond to the second ultrasound image frame of the systolic cycle acquired and analyzed. As an example, the volume flow measured at this particular frame would be about 120 ml/s. In some embodiments, a point 2212 may not be placed along the curve 2210 for every ultrasound image frame from systole acquired and analyzed. For example, a point 2212 may be placed along the curve 2210 after every second, third, fourth, or more frames. In some embodiments, the system 100 or the user of the system 100 may add additional points 2212 along the curve to identify various regions of interest along the curve or for other reasons. In addition, the user or the system 100 may remove one, some, or all of the points 2212 from the plot 2200. Similarly, several points 2222 are shown positioned along the curve 2220. Like the points 2212, these points 2222 may correspond to individual ultrasound image frames or may not. The points 2222 may be spaced like the points 2212 and the user or the system 100 may add or remove points 2222.

In some embodiments, the user of the system 100 may wish to know the total volume which passed through the orifice of the mitral valve during the systolic phase. In some embodiments, this metric may be determined by integrating all of the known volume flow data creating the volume flow curve 2210 (e.g., area under the curve). The total regurgitant volume during an entire systolic phase may assist a physician in determining proper treatment of a leaking mitral valve.

In some embodiments, the processor circuit can also compute a confidence metric that evaluates the correlation/match between flow model and the 3D Doppler ultrasound data. For example, the metric can be based on, e.g., a degree of numerical overlap between the velocities provided by the flow model and the 3D Doppler ultrasound data and/or a degree of spatial overlap of different velocity regions provided by the flow model and the 3D Doppler ultrasound data. The confidence metric can be output as a curve. For example, the confidence metric can be plotted along the y-axis over time along the x-axis. Each point can correspond to a particular shape of the orifice model. As the orifice model is refined over time, the value of the confidence metric increases. In some embodiments, the confidence metric can be plotted along the y-axis over the image frames along the x-axis. This curve corresponds to one iteration of the orifice model (e.g., an initial orifice model, a final orifice model, or an interim orifice model between the initial and final versions). The curve provides the confidence metric for each image frame, which may or may not vary depending on the ultrasound data for that image frame and/or the calculated flow model for that frame.

Figure 23B:
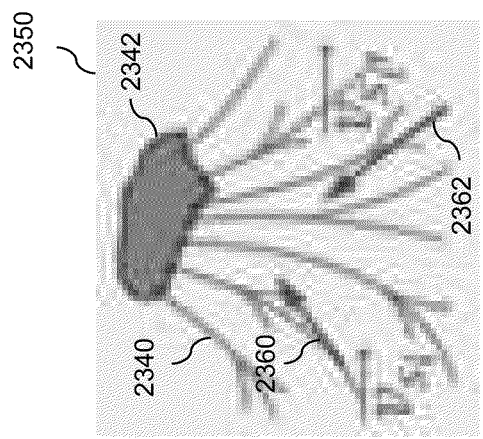
FIG. 23B is a diagrammatic view of a blood flow model, according to aspects of the present disclosure.
Figure 23A:
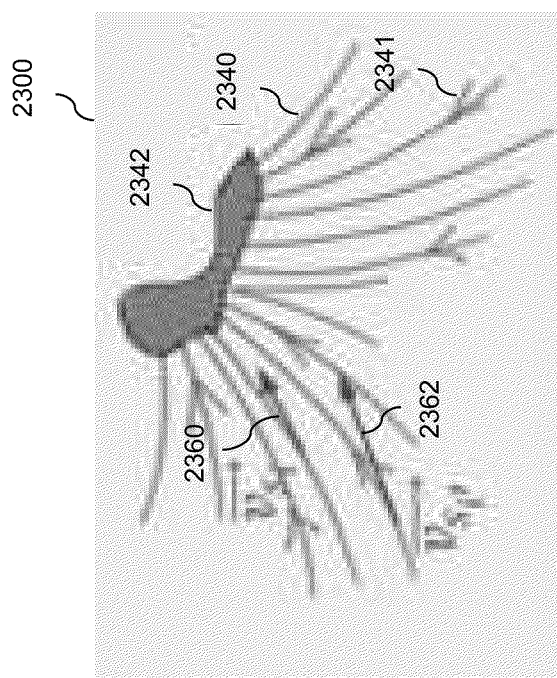
FIG. 23A is a diagrammatic view of a blood flow model, according to aspects of the present disclosure.

FIG. 23A is a diagrammatic view of a blood flow model 2300, according to aspects of the present disclosure. FIG. 23A includes a depiction of an orifice model 2342, three-dimensional streamlines 2340 and velocity vectors 2350 and 2352. As shown in FIG. 23A, the processor circuit 210 may generate a four-dimensional mitral valve regurgitation model. This 4D mitral valve regurgitation model may include, among other elements, various quantifications of the blood flow through the orifice 2342 throughout systole. The model 2342 can be a 3D surface-rendered model of the orifice.

As shown in FIG. 23A, the streamlines 2340 may indicate the directional flow of the blood as it moves through the orifice 2342. The streamlines 2340 may be 3D and computed and/or derived from the shape of the orifice 2342. As explained previously with reference to FIG. 3, a blood flow model, like the model 2300 shown, may be generated for each ultrasound image received by the system 100. In this way, the blood flow model may vary with time. The model 2300 may, therefore, indicate the direction and velocity of blood throughout the three-dimensional space immediately around the mitral valve throughout a time dimension (fourth dimension). In some embodiments, the streamlines 2340 may additionally visually indicate the velocity of the blood flow at various locations around the mitral valve orifice 2342 by variations in their appearance. For example, the streamlines 2340 may include arrows 2341 positioned along the streamlines 2340. The relative positions of these arrows 2341 may indicate a relative speed. For example, a higher density of arrows 2341 or decreased spacing between the arrows 2341 along a particular streamline 2340 may indicate a higher velocity than a streamline with less densely spaced arrows 2341 or more space between the arrows 2341.

The model 2300 may additionally include velocity vectors 2360 and/or 2362 as shown.

The velocity vectors 2360 and 2362 may also indicate the velocity and direction of blood flow as defined by the blood flow model 2300 at various locations in the space. Additional velocity vectors may be placed throughout the space by the system 100 either automatically or at the direction of a user input. One velocity vector, such as the velocity vector 2360, may correspond to a different location and/or time as another velocity vector, such as the velocity vector 2362.

At each frame t, the regurgitant flow is computed from the velocities along the computed 3D streamlines 2340:

$$RVol(t) = \int \vec{v_s} ds \qquad (3)$$

where $\vec{v_s}$ is the velocity along the streamline s. The total regurgitant volume is obtained by integration over the regurgitation duration:

$$RVol = \int_{t_0}^{t_1} RVol(t)ds. \qquad (4)$$

FIG. 23B is a diagrammatic view of a blood flow model 2350, according to aspects of the present disclosure. The model 2350 may be substantially similar to the model 2300 described with reference to FIG. 23A. For example, the model 2350 may be a view of the model 2300 from a different perspective. The model 2350 may include the same orifice 2342, streamlines 2340 and velocity vectors 2360 and 2362. In this way, the model 2350 may also include four-dimensional data including velocity magnitude and direction data of the blood flow near the orifice 2342. In other embodiments, model 2350 is representative of a different orifice 2342, streamlines 2340, and velocity vectors 2360 and 2362.

Figure 24:
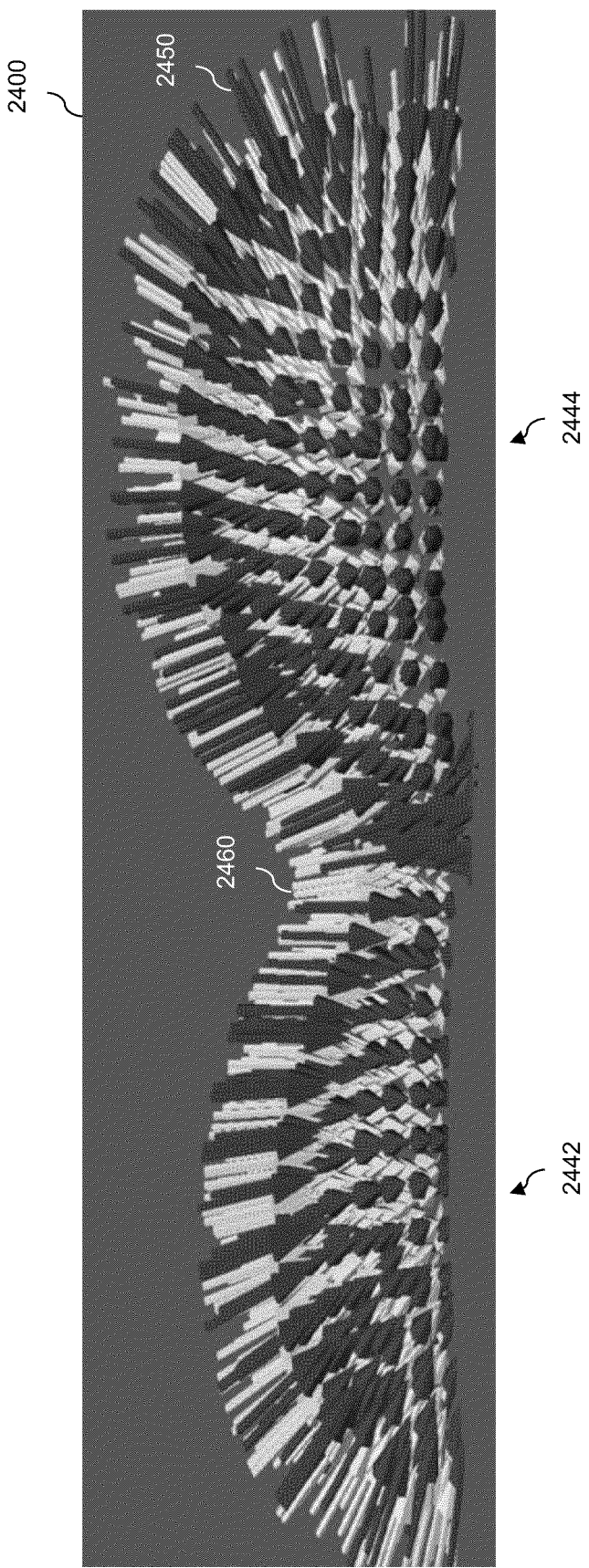
FIG. 24 is a diagrammatic view of a blood flow model generated using a computed flow dynamics technique compared with a blood flow model generated using a hole shape flow model, according to aspects of the present disclosure.

FIG. 24 is a diagrammatic view of a blood flow model 2460 generated using a computed flow dynamics technique compared with a blood flow model 2450 generated using a hole shape flow model, according to aspects of the present disclosure. The image 2400 shown reflects a comparison of a blood flow model 2450 created using techniques and methods described in the present disclosure. For example, the model 2450 includes multiple velocity vectors indicating blood flow through two orifices, an orifice 2442 and an orifice 2444.

For comparison, a model 2460 is also shown. The model 2460 may have been generated using the computational fluid dynamics (CFD) technique. The CFD technique is considered accurate, it is far too computationally intensive to be of practical use for real time imaging procedures. The CFD is more computationally intensive as it requires solving numerically the physical equations that govern the fluid behavior. In order to ensure the stability and accuracy of the computations, the domain must be discretized in space and in time using small spatial steps and small timesteps, which is advantageously not required according to the present disclosure. As shown in the image 2400, however, the currently disclosed method, or hole shape flow model, provides a significantly faster and efficient algorithm while providing at least equally accurate results as CFD. Unlike CFD, aspects of the present disclosure can be advantageously performed in real-time or near real-time, or live during an ultrasound imaging procedure, thereby providing the physician with additional clinical information during the procedure itself. As shown by the velocity vectors of the model 2460 of the CFD technique compared with the velocity of the model 2450 of the hole shape model, the blood flow models generated with both techniques are very accurate. The increased speed and efficiency of the hole shape flow model allows for easy mitral regurgitation visualization and quantification during a patient-side imaging procedure, treatment procedure, or in a variety of other settings while retaining and even improving accuracy over past algorithms.

The present disclosure has been described using examples such as mitral regurgitation, the mitral valve, blood flow, the left ventricle, and the left atrium. However, other examples are contemplated. Aspects of the present disclosure can be applied to any flow of any fluid between any volumes/chambers/lumens with a valve in between (whether natural or manmade). For example, the present disclosure can be used for aortic regurgitation associated with the tricuspid valve. Furthermore, a variation of the algorithm can also be used to compute the inflow from the mitral valve; that is, the blood flow volume from the left atrium to the left ventricle.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An ultrasound system, comprising:
an array of acoustic elements configured to obtain ultrasound data, wherein the ultrasound data comprises Doppler data and B-mode data;
a processor circuit configured for communication with the array of acoustic elements and a display, wherein the processor circuit is configured to:
receive the ultrasound data obtained by the array of acoustic elements, wherein the ultrasound data is representative of mitral regurgitation associated with an orifice in a mitral valve;
generate a model of the mitral valve based on the B-mode data;
generate a model of the orifice based on the model of the mitral valve and the Doppler data;
output a first screen display to the display, wherein the first screen display comprises:
the model of the mitral valve; and
the model of the orifice in the model of the mitral valve;
generate a blood flow model of the mitral regurgitation based on the model of the orifice;
compare the blood flow model to the Doppler data;
change the model of the orifice such that the blood flow model is changed to match the Doppler data, wherein the model of the orifice is changed to have at least one of a different shape, a different position, or a different orientation; and
output a second screen display to the display, wherein the second screen display comprises:
an ultrasound image based on the ultrasound data; and
the model of the orifice in the ultrasound image, wherein the model of the orifice in the second screen display comprises at least one of the different shape, the different position, or the different orientation.

2. The ultrasound system of claim 1, wherein the model of the mitral valve comprises an anatomic model of the mitral valve, and wherein the generating the model of the orifice comprises identifying, based on the Doppler data, an orifice within the anatomic model of the mitral valve.

3. The ultrasound system of claim 2, wherein the processor circuit is configured to identify the orifice based on a velocity in the Doppler data exceeding a threshold velocity.

4. The ultrasound system of claim 3, wherein, to change the shape of the orifice, the processor circuit is configured to modify the threshold velocity.

5. The ultrasound system of claim 1, wherein, to change the position of the orifice, the processor circuit is configured to move the orifice along a perpendicular direction in the model of the mitral valve.

6. The ultrasound system of claim 1, wherein the processor circuit is configured to output a 3D isovelocity surface based on the blood flow model of the mitral regurgitation.

7. The ultrasound system of claim 1,
wherein the second screen display comprises a first ultrasound image based on the ultrasound data and a second ultrasound image based on the ultrasound data,
wherein the first ultrasound image is oriented along a first axis, and
wherein the second ultrasound image is oriented along a different, second axis.

8. The ultrasound system of claim 7, wherein the first ultrasound image and the second ultrasound image (i) are based on multiplanar reformation (MPR), or (ii) comprise side views.

9. The ultrasound system of claim 7, wherein the first axis and the second axis correspond to the changed shape of the orifice.

10. The ultrasound system of claim 1,
wherein the processor circuit is configured to determine at least one of a flow volume, an orifice area, or a confidence metric, and
wherein the processor circuit is configured to output, to the display, a graphical representation based on at least one of the flow volume, the orifice area, or the confidence metric.

11. A computer-implemented method comprising the steps of:
receiving the ultrasound data obtained by the array of acoustic elements, wherein the ultrasound data is representative of mitral regurgitation associated with an orifice in a mitral valve;
generating a model of the mitral valve based on the B-mode data;
generating a model of the orifice based on the model of the mitral valve and the Doppler data;
outputting a first screen display to the display, wherein the first screen display comprises:
the model of the mitral valve; and
the model of the orifice in the model of the mitral valve;
generating a blood flow model of the mitral regurgitation based on the model of the orifice;
comparing the blood flow model to the Doppler data;
changing the model of the orifice such that the blood flow model is changed to match the Doppler data, wherein the model of the orifice is changed to have at least one of a different shape, a different position, or a different orientation; and
outputting a second screen display to the display, wherein the second screen display comprises:
an ultrasound image based on the ultrasound data; and
the model of the orifice in the ultrasound image, wherein the model of the orifice in the second screen display comprises at least one of the different shape, the different position, or the different orientation.

* * * * *